United States Patent
Yang et al.

(10) Patent No.: US 11,977,932 B2
(45) Date of Patent: May 7, 2024

(54) INFORMATION SHARING METHOD AND APPARATUS, TERMINAL DEVICE, AND STORAGE MEDIUM

(71) Applicant: HONOR DEVICE CO., LTD., Guangdong (CN)

(72) Inventors: Shishu Yang, Shenzhen (CN); Ke Sun, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/907,783

(22) PCT Filed: Oct. 22, 2021

(86) PCT No.: PCT/CN2021/125872
§ 371 (c)(1),
(2) Date: Aug. 29, 2022

(87) PCT Pub. No.: WO2022/042767
PCT Pub. Date: Mar. 3, 2022

(65) Prior Publication Data
US 2023/0135795 A1 May 4, 2023

(30) Foreign Application Priority Data
Aug. 27, 2020 (CN) .......................... 202010892793.8

(51) Int. Cl.
*G06F 9/54* (2006.01)
*G06F 3/0482* (2013.01)
*G06F 3/04847* (2022.01)

(52) U.S. Cl.
CPC .............. *G06F 9/54* (2013.01); *G06F 3/0482* (2013.01); *G06F 3/04847* (2013.01)

(58) Field of Classification Search
CPC ...... G06F 9/54; G06F 3/0482; G06F 3/04847; G06F 1/1698; G06F 3/165;
(Continued)

(56) References Cited

U.S. PATENT DOCUMENTS 6,918,091 B2 * 7/2005 Leavitt .................... G06F 9/451
715/779
8,457,651 B2 * 6/2013 Forutanpour ..... H04M 1/72412
345/158
(Continued)

FOREIGN PATENT DOCUMENTS

| CN | 102917116 A | 2/2013 |
| CN | 103368984 A | 10/2013 |

(Continued)

OTHER PUBLICATIONS

Notice of Allowance issued in CN202310141594.7, dated Dec. 20, 2023, 6 pages.

*Primary Examiner* — Abdullahi E Salad

(57) ABSTRACT

This application is applicable to the field of device interaction technologies and provides an information sharing method and apparatus, a terminal device and a storage medium. The method includes: The method includes: when detecting a trigger gesture performed by a user on an interface element in a current display interface of a terminal device, determining whether the interface element is a shareable object; if the interface element is an unshareable object, determining a shareable target object associated with the interface element; and sharing the target object with a specified target device. This application can effectively improves information sharing efficiency between devices.

15 Claims, 15 Drawing Sheets

(58) Field of Classification Search
CPC ....... G06F 2203/04808; G06F 3/04817; G06F 3/04883; H04W 4/023; H04W 4/02; H04W 4/80; H04N 21/4122; H04N 21/43076; H04N 21/43615; H04N 21/43637; H04N 21/44227; H04N 21/41407

See application file for complete search history.

(56) References Cited

U.S. PATENT DOCUMENTS

| | | | |
|---|---|---|---|
| 8,756,519 B2* | 6/2014 | Hunt | G06F 3/0486 715/823 |
| 9,557,955 B2* | 1/2017 | Rakshit | G02B 27/017 |
| 9,612,723 B1* | 4/2017 | Elliot | G06F 3/0482 |
| 9,632,851 B1 | 4/2017 | Johansson et al. | |
| 10,114,543 B2 | 10/2018 | Dand | |
| 11,073,983 B2 | 7/2021 | Zhu et al. | |
| 11,249,635 B2* | 2/2022 | Ye | G06F 3/04883 |
| 2002/0152244 A1* | 10/2002 | Dean | G06F 40/154 715/255 |
| 2009/0077501 A1* | 3/2009 | Partridge | G06F 3/048 715/846 |
| 2010/0121919 A1 | 5/2010 | Hepworth et al. | |
| 2011/0081923 A1 | 4/2011 | Forutanpour et al. | |
| 2013/0145287 A1* | 6/2013 | Jung | G06F 1/1698 715/753 |
| 2015/0009152 A1 | 1/2015 | Tang et al. | |
| 2016/0088035 A1 | 3/2016 | Yu et al. | |
| 2016/0124582 A1 | 5/2016 | Sohn et al. | |
| 2017/0010673 A1* | 1/2017 | Mital | G06F 3/04842 |
| 2017/0046037 A1* | 2/2017 | Dand | G06F 3/1454 |
| 2017/0052759 A1 | 2/2017 | Chaudhri et al. | |
| 2017/0102852 A1 | 4/2017 | Agrawal et al. | |
| 2017/0257403 A1 | 9/2017 | Li et al. | |
| 2020/0257425 A1* | 8/2020 | Ye | G06F 3/04883 |
| 2020/0259673 A1 | 8/2020 | Aono | |
| 2020/0259771 A1 | 8/2020 | Song | |
| 2022/0279062 A1 | 9/2022 | Ye | |
| 2022/0286496 A1 | 9/2022 | Qi | |
| 2022/0300302 A1 | 9/2022 | Zhong | |

FOREIGN PATENT DOCUMENTS

| | | |
|---|---|---|
| CN | 103472974 A | 12/2013 |
| CN | 104281467 A | 1/2015 |
| CN | 104539319 A | 4/2015 |
| CN | 104601205 A | 5/2015 |
| CN | 104820683 A | 8/2015 |
| CN | 105653178 A | 6/2016 |
| CN | 105824661 A | 8/2016 |
| CN | 106354407 A | 1/2017 |
| CN | 106973381 A | 7/2017 |
| CN | 108874758 A | 11/2018 |
| CN | 108920119 A | 11/2018 |
| CN | 109521918 A | 3/2019 |
| CN | 109618316 A | 4/2019 |
| CN | 109697008 A | 4/2019 |
| CN | 110191045 A | 8/2019 |
| CN | 110378145 A | 10/2019 |
| CN | 110597473 A | 12/2019 |
| CN | 110622487 A | 12/2019 |
| CN | 111049979 A | 4/2020 |
| CN | 111092990 A | 5/2020 |
| EP | 3617869 A1 | 3/2020 |
| EP | 3982247 A1 | 4/2022 |
| EP | 4060969 A1 | 9/2022 |
| WO | 2014206037 A1 | 12/2014 |
| WO | 2017027750 A1 | 2/2017 |
| WO | 2017193496 A1 | 11/2017 |
| WO | 2018113751 A1 | 6/2018 |

\* cited by examiner

INFORMATION SHARING METHOD AND APPARATUS, TERMINAL DEVICE, AND STORAGE MEDIUM This application is a national stage of International Application No. PCT/CN2021/125872, filed on Oct. 22, 2021, which claims priority to Chinese Patent Application No. 202010892793.8, filed on Aug. 27, 2020. Both of the aforementioned applications are hereby incorporated by reference in their entireties.

TECHNICAL FIELD

This application relates to the field of device interaction technologies, and in particular, to an information sharing method and apparatus, a terminal device, and a computer-readable storage medium.

BACKGROUND

With the continuous development and popularization of terminal technologies, multi-device interaction scenarios, such as smart home and screen projection control, gradually appear in people's daily life. In the multi-device interaction scenarios, operations of sharing some information of one device with another device are usually involved, for example, sharing an audio file of a mobile phone with a tablet computer.

Currently, information is usually shared between devices in a short-distance wireless communication manner such as Bluetooth. However, in existing information sharing technologies, users need to memorize and find the information sharing portal accurately. For example, to share music, a user needs to find the music that is being played, searches for a target device, and shares the music with the target device. The entire process involves complex operations, and the information sharing efficiency is low.

SUMMARY

In view of this, embodiments of this application provide an information sharing method and apparatus, a terminal device, and a computer-readable storage medium, to improve information sharing efficiency between devices.

According to a first aspect, an embodiment of this application provides an information sharing method, applied to a terminal device. The method includes:

when detecting a trigger gesture performed by a user on an interface element in a current display interface of the terminal device, determining whether the interface element is a shareable object;

if the interface element is an unshareable object, determining a shareable target object associated with the interface element; and sharing the target object with a specified target device.

In such settings, when sharing information, the user only needs to make a gesture on the current display interface of the terminal device to select an interface element, and a terminal system can find, based on a preset logical relationship of the interface element, the information object that the user intends to share, and share the object with a specified device. In the process, the user does not need to memorize or find an information sharing portal. Therefore, the information sharing efficiency between devices can be improved effectively, and the method is easy to use and is very useful.

Further, the determining a shareable target object associated with the interface element may include:

determining a background program that is running and that is associated with the interface element; and obtaining the target object from the background program.

To determine the target object associated with the interface element, the background program that is running and that is associated with the interface element needs to be determined first. Then, the background program may be searched for the shareable target object. For example, if the background program associated with the interface element is a browser, a default home page link of the browser may be used as the shareable target object; and if the background program associated with the interface element is a media player, a media file that is being played by the media player may be used as the shareable target object.

Further, the determining a background program that is running and that is associated with the interface element may include:

determining a system resource controlled by the interface element;

searching for the background program that is running and that occupies the system resource; and determining the found background program as the background program associated with the interface element.

Some button-type interface elements are usually used to control some system resources, and some background programs occupy these system resources exactly during running. In this way, the interface elements are associated with the background programs. For example, an interface element triggered by a gesture is a volume slider, and a system resource controlled by the volume slider is media volume. In this case, a background program (for example, a media player) that is running and that occupies the media volume may be viewed as a background program associated with the interface element.

Further, when the interface element is a volume slider and the background program associated with the volume slider is a media player, the obtaining the target object from the background program may include:

obtaining a media file that is being played by the media player; and determining the obtained media file as the target object.

For example, if a media player is a background program associated with the volume slider, and the media player is occupying the media volume to play a song, the song may be determined as a to-be-shared target object.

Further, the sharing the target object with a specified target device may include:

when detecting a screen projection operation, sending the media file to the target device in response to the screen projection operation, so that the target device displays and plays the media file.

If the target object is a media file, the terminal device may project the media file onto the target device for play. In addition, the user may further adjust the volume slider in the display interface of the terminal device by making the trigger gesture to adjust the volume for playing the media file on the target device.

Further, the determining a shareable target object associated with the interface element may include:

obtaining a function service associated with the interface element; and determining a permission of the function service as the target object.

Some particular interface elements are associated with some function services. For example, if the interface element is a Wi-Fi switch, a function service associated with the interface element is a Wi-Fi network; and if the interface element is a network switch of a mobile phone, a function service associated with the interface element is a 4G/5G network. Permissions of these function services may be used as to-be-shared target objects.

Further, when the interface element is a switch of a wireless network, the sharing the target object with a target device may include:

obtaining a shared whitelist of the wireless network to which the terminal device is connected; and adding the target device to the shared whitelist of the wireless network.

When the interface element is a Wi-Fi switch on a control panel of the device, it indicates to share, with the specified target device, the permission of accessing a wireless network to which the terminal device is connected. In this case, the terminal device obtains a shared whitelist of the wireless network to which the terminal device is connected, and then adds, to the shared whitelist of the wireless network, a name or a user account of the target device that is not connected to the wireless network and that is selected by the user, where the target device is around the terminal device. Then, the target device can be connected to the wireless network without password.

Further, before the sharing the target object with a specified target device, the method may further include:

obtaining location information of the terminal device and location information of all devices within a preset range around the terminal device;

displaying the location information of the terminal device and the location information of all the devices in the display interface of the terminal device; and selecting the target device from all the devices according to an inputted device selection instruction.

By obtaining the location information of the terminal device and the location information of all the devices within the preset range around the terminal device, and displaying the location information in the display interface of the terminal device, the user can directly view the devices around the terminal device and relatively positional relationships between these devices and the terminal device. In this way, the time that the user spends to search for the target device can be shortened.

Further, after the interface element triggered by the gesture instruction in the current display interface of the terminal device is determined, the method may further include:

if the interface element is a shareable object, sharing the interface element with the target device.

If the interface element is a shareable object, the interface element may be directly shared with the specified target device. For example, if the interface element triggered by a gesture made by the user in the current display interface of the terminal device is an image and the image is a shareable object, a list of target devices around the terminal device may be displayed in the interface of the terminal device, and the user selects one or more target devices from the list and shares the image with the one or more target devices selected by the user.

According to a second aspect, an embodiment of this application provides an information sharing apparatus, applied to a terminal device. The apparatus includes:

a gesture detection module, configured to: when detecting a trigger gesture performed by a user on an interface element in a current display interface of the terminal device, determine whether the interface element is a shareable object;

an object determining module, configured to: if the interface element is an unshareable object, determine a shareable target object associated with the interface element; and an object sharing module, configured to share the target object with a specified target device.

According to a third aspect, an embodiment of this application provides a terminal device. The terminal device includes a memory, a processor, and a computer program that is stored in the memory and that can be run on the processor, where when the processor executes the computer program, the terminal device implements the information sharing method according to the first aspect of the embodiments of this application.

According to a fourth aspect, an embodiment of this application provides a computer-readable storage medium. The computer-readable storage medium stores a computer program. When the computer program is executed, the information sharing method according to the first aspect of the embodiments of this application is implemented.

According to a fifth aspect, an embodiment of this application provides a computer program product. When the computer program product is run on a terminal device, the terminal device is enabled to perform the information sharing method according to the first aspect of the embodiments of this application.

For technical effects that can be implemented in the second to the fifth aspects, refer to the technical effects in the first aspect. Details are not described herein again.

Compared with the existing technology, the beneficial effects of the embodiments of this application is that operation efficiency of sharing information between devices can be improved, and the embodiments of this application are easy to implement and are very practical.

DESCRIPTION OF EMBODIMENTS

In the following description, for the purpose of illustration rather than limitation, specific details such as specific apparatus structures and technologies are provided to provide a thorough understanding of embodiments of this application. However, a person skilled in the art should understand that the embodiments may be implemented without these specific details. In other cases, detailed descriptions about a well-known apparatus, circuit, and method are omitted to prevent unnecessary details from obscuring the description of this application.

The terms used in the following embodiments are for the purpose of describing particular embodiments only and are not intended to be limiting of this application. As used in the appended claims and specification of this application, an expression in the singular such as "a", "an", "the", or "this" includes an expression in the plural such as "one or more", unless clearly indicated to the contrary in the context. It should be further understood that in the embodiments of this application, "one or more" means one, two, or more than two; and the term "and/or" describes an association relationship between associated objects and represents that three relationships may exist. For example, A and/or B may represent that only A exists, both A and B exist, and only B exists, where A and B may be singular or plural. The character "/" generally indicates an "or" relationship between associated objects.

In the multi-device interaction scenarios, operations of sharing some information objects of one device with another device are usually involved. Currently, information is usually shared between devices in a manner such as mobile phone Bluetooth. However, during operation, a user still needs to memorize and find an information sharing portal, select a to-be-shared object, trigger a sharing function, select a target device to be shared with, and finally tap to confirm to share the object with the target device. For example, the user needs to find an information sharing portal clearly on a music play screen or an image detail screen, tap to enter a list of recognizable devices around, and select a target device in the device list to complete information sharing. As can be learned, the operation process is complex, resulting in low information sharing efficiency.

To resolve the foregoing problem, this application provides an information sharing method, to simply operations of sharing information by a user and improve the information sharing efficiency.

Figure 1:
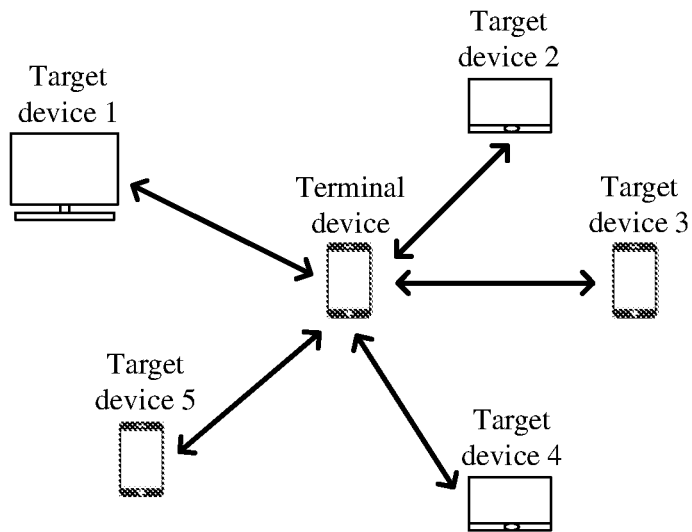
FIG. 1 is a schematic diagram of a system to which an information sharing method is applicable according to an embodiment of this application.

FIG. 1 is a schematic diagram of a system to which an information sharing method is applicable according to an embodiment of this application.

FIG. 1 shows one terminal device and a plurality of target devices. The terminal device is a source device of information sharing, to be specific, a user needs to share an information object of the terminal device with a target device. The target devices are devices that are to receive the information object and that are within a range around the terminal device. The user may select one or more target devices from these target devices, and share the information object of the terminal device with the selected one or more target devices. The plurality of target devices (a mobile phone, a tablet computer, and a big-screen TV) may be connected to the terminal device in a manner such as Wi-Fi or Bluetooth. During operation, the user may use the information sharing method provided in this application to perform an operation on the terminal device and share the information object with the selected one or more target devices. For a specific implementation principle, refer to the following method embodiments and practical application scenarios.

The information sharing method provided in this embodiment of this application may be applied to terminal devices such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), and a big-screen TV. Specific types of terminal device are not limited in this embodiment of this application.

For example, the terminal device may be a station (STATION, ST) in a WLAN, a cellular phone, a cordless phone, a session initiation protocol (Session Initiation Protocol, SIP) phone, a wireless local loop (Wireless Local Loop, WLL) station, a personal digital assistant (Personal Digital Assistant, PDA) device, a handheld device with a wireless communication function, a computing device or another processing device connected to a wireless modem, a vehicle-mounted device, an internet of vehicles terminal, a computer, a laptop computer, a handheld communication device, a handheld computing device, a satellite wireless device, a wireless modem card, a TV set top box (set top box, STB), customer premise equipment (customer premise equipment, CPE), and/or another device used for communication on a wireless apparatus, or a next-generation communication apparatus, for example, a mobile terminal in a 5G network or a mobile terminal in a future evolved public land mobile network (Public Land Mobile Network, PLMN).

By way of example but not limitation, when the terminal device is a wearable device, the wearable device may be a general term for daily wearable devices, such as glasses, gloves, watches, clothing and shoes, developed and designed by using wearable technologies. The wearable device is a portable device that is directly worn on the body or integrated into clothes or an accessory of a user. The wearable device is not only a hard device, but also a device with a strong function implemented with the support of software, data exchange, and cloud interaction. In a broad sense, wearable smart devices include devices that have full functions or large sizes or that can achieve all or partial functions without relying on smart phones, for example, smart watches or smart glasses, and include devices only focusing on a particular type of application functions and needing to cooperate with other devices such as smart phones, for example, all types of smart bracelets and smart jewelry for physical sign monitoring.

Figure 2:
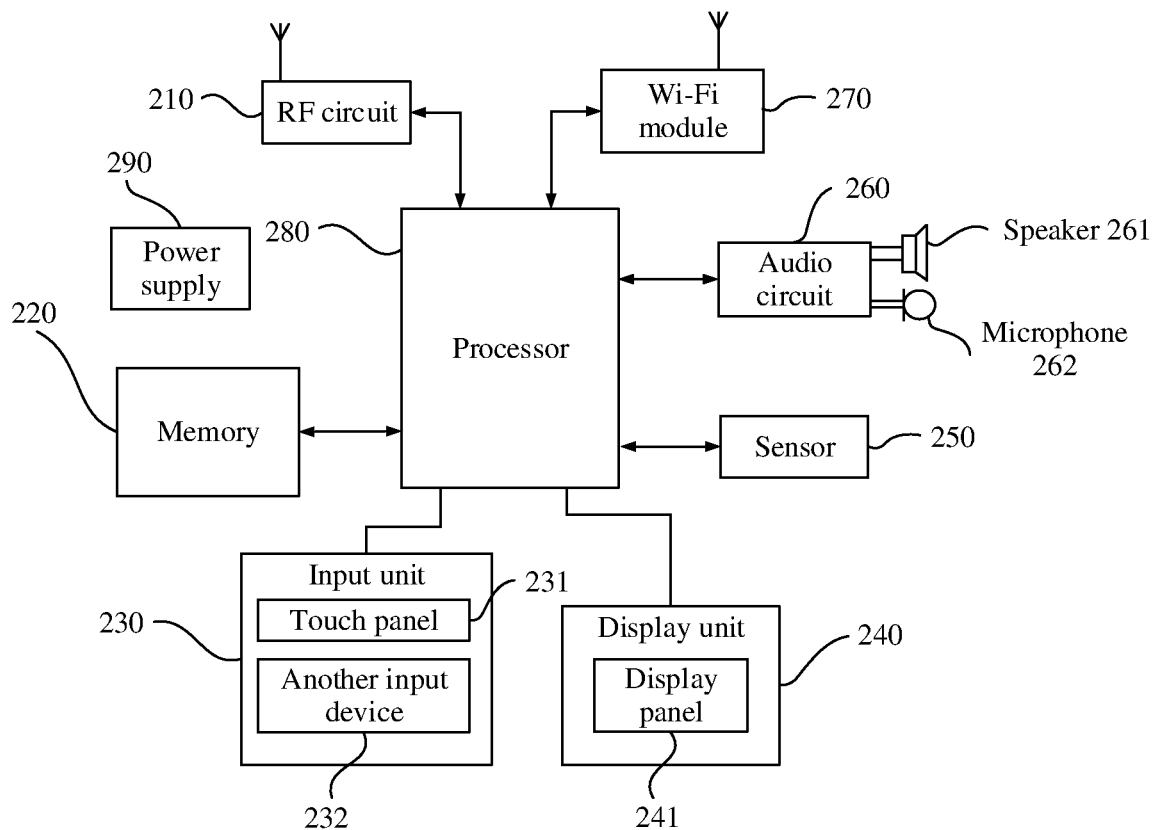
FIG. 2 is a diagram of a hardware structure of a terminal device according to an embodiment of this application.

For example, the terminal device is a mobile phone. FIG. 2 is a block diagram of a part of structure of a mobile phone according to an embodiment of this application. As shown in FIG. 2, the mobile phone includes components such as a radio frequency (Radio Frequency, RF) circuit 210, a memory 220, an input unit 230, a display unit 240, a sensor 250, an audio circuit 260, a wireless fidelity (wireless fidelity, Wi-Fi) module 270, a processor 280, and a power supply 290. A person skilled in the art may understand that the structure of the mobile phone shown in FIG. 2 does not constitute a limitation on the mobile phone. The mobile phone may include more or fewer components than those shown in the figure, or some components may be combined, or a different component arrangement may be used.

The following specifically describes each component of the mobile phone with reference to FIG. 2.

The RF circuit 210 may be configured to: receive and send information or signals in a communication process; and particularly, receive downlink information from a base station, send the downlink information to the processor 280 for processing, and send uplink data to the base station. Usually, the RF circuit includes but is not limited to an antenna, at least one amplifier, a transceiver, a coupler, a low noise amplifier (Low Noise Amplifier, LNA), a duplexer, and the like. In addition, the RF circuit 210 may further communicate with another device through wireless communication or a network. The foregoing wireless communication may use any communication standard or protocol, including but not limited to a global system of mobile communication (Global System of Mobile communication, GSM) standard, a general packet radio service (General Packet Radio Service, GPRS) standard, a code division multiple access (Code Division Multiple Access, CDMA) standard, a wideband code division multiple access (Wideband Code Division Multiple Access, WCDMA) standard, a long term evolution (Long Term Evolution, LTE)) standard, an e-mail standard, a short messaging service (Short Messaging Service, SMS) standard, and the like.

The memory 220 may be configured to store a software program and module. The processor 280 runs the software program and module stored in the memory 220 to execute various functional applications and data processing of the mobile phone. The memory 220 may mainly include a program storage area and a data storage area. The program storage area may store an operation apparatus, an application required by at least one application program (for example, an audio play function or an image play function), and the like. The data storage area may store data (for example, audio data and a phone book) created based on use of the mobile phone and the like. In addition, the memory 220 may include a high-speed random-access memory, and may further include a non-volatile memory, for example, at least one magnetic disk memory, a flash memory, or another volatile solid-state memory.

The input unit 230 may be configured to: receive inputted digital or character information, and generate a key signal input related to a user setting and function control of the mobile phone. Specifically, the input unit 230 may include a touch panel 231 and another input device 232. The touch panel 231, also referred to as a touchscreen, may collect a touch operation (for example, an operation performed by a user on or near the touch panel 231 with a finger or a stylus) performed by a user on or near the touch panel 231, and drive a corresponding connection apparatus according to a preset program. Optionally, the touch panel 231 may include a touch detection apparatus and a touch controller. The touch detection apparatus detects a touch direction of the user and a signal brought by the touch operation, and sends the signal to the touch controller. The touch controller receives touch information from the touch detection apparatus, converts the touch information into touch point coordinates, sends the touch point coordinates to the processor 280, and can receive and execute a command sent by the processor 280. In addition, the touch panel 231 may be implemented in resistive, capacitive, infrared, and surface acoustic wave manners. In addition to the touch panel 231, the input unit 230 may further include the another input device 232. Specifically, the another input device 232 may include but is not limited to one or more of a physical keyboard, a function key (for example, a volume control key or an on/off key), a trackball, a mouse, a joystick, and the like.

The display unit 240 may be configured to display information entered by the user or information provided for the user and various menus of the mobile phone. The display unit 240 may include a display panel 241. Optionally, the display panel 241 may be configured in a form of a liquid crystal display (Liquid Crystal Display, LCD), an organic light-emitting diode (Organic Light-Emitting Diode, OLED), or the like. Further, the touch panel 231 may cover the display panel 241. After detecting a touch operation on or near the touch panel 231, the touch panel 231 sends the touch operation to the processor 280 to determine a type of a touch event. Subsequently, the processor 280 provides a corresponding visual output on the display panel 241 based on the type of the touch event. Although in FIG. 2, the touch panel 231 and the display panel 241 respectively implement the input and output functions of the mobile phone as two independent components, in some embodiments, the touch panel 231 and the display panel 241 may be integrated to implement the input and output functions of the mobile phone.

The mobile phone may further include at least one sensor 250, for example, an optical sensor, a motion sensor, or another sensor. Specifically, the optical sensor may include an ambient light sensor and a proximity sensor. The ambient light sensor may adjust luminance of the display panel 241 based on brightness of ambient light. The proximity sensor may turn off the display panel 241 and/or backlight when the mobile phone is moved to the ears. As a motion sensor, an accelerometer sensor may detect values of accelerations in all (usually triaxial) directions, may detect a value and direction of gravity when static, and may be used for applications (for example, a portrait-landscape orientation switch application, a related game, a magnetometer attitude calibration application) identifying an attitude of the mobile phone and related functions (for example, a pedometer or a hitting function) identifying vibrations. Other sensors, such as a gyroscope, a barometer, a hygrometer, a thermometer, and an infrared sensor, that may be configured on the mobile phone are not described herein.

The audio circuit 260, a speaker 261, and a microphone 262 may provide audio interfaces between the user and the mobile phone. The audio circuit 260 may transmit, to the speaker 261, an electrical signal converted from audio data; and the speaker 261 converts the electrical signal into an audio signal for output. In addition, the microphone 262 converts a collected audio signal into an electrical signal; and the audio circuit 260 receives the electrical signal and converts the electrical signal into audio data, and outputs the audio data to the processor 280 for processing. Then, the RF circuit 210 sends the audio data to, for example, another mobile phone, or outputs the audio data to the memory 220 for further processing.

Wi-Fi is a short-distance wireless transmission technology. With the Wi-Fi module 270, the mobile phone may help the user receive and send emails and browse web pages and access streaming media. The Wi-Fi module 270 provides wireless broadband internet access for the user. Although FIG. 2 shows the Wi-Fi module 270, it may be understood that the Wi-Fi module 270 is not a necessary component of the mobile phone and can completely be omitted based on requirements without departing from the essence of this application.

The processor 280 is the control center of the mobile phone, connects all components of the mobile phone through various interfaces and lines, and executes various functions and data processing of the mobile phone by running or executing the software program and/or module stored in the memory 220 and invoking data stored in the memory 220, to overally monitor the mobile phone. Optionally, the processor 280 may include one or more processing units. Preferably, the processor 280 may be integrated with an application processor and a modem processor. The application processor mainly processes an operation apparatus, a user interface, and an application program. The modem processor mainly processes wireless communication. It may be understood that the modem processor may alternatively not be integrated into the processor 280.

The mobile phone further includes a power supply 290 (for example, a battery) that powers various components. Preferably, the power supply may be logically connected to the processor 280 through a power management apparatus, to implement functions such as charging, discharging, and power consuming management through the power management apparatus.

Although not shown in the figure, the mobile phone may further include cameras, which include at least one regular RGB camera and at least one infrared camera or hyper spectral camera. Optionally, the cameras may be front cameras or rear cameras on the mobile phone. This is not limited in this embodiment of this application.

Optionally, the mobile phone may include a single camera, a dual camera, a triple camera, or the like. This is not limited in this embodiment of this application.

For example, the mobile phone may include a triple camera, which include one main lens, one wide-angle lens, and one telephoto lens.

Optionally, when the mobile phone includes a plurality of lenses, the plurality of lenses may be completely or partially front or rear. This is not limited in this embodiment of this application.

In addition, although now shown in the figure, the mobile phone may further include a Bluetooth module. Details are not described herein.

Figure 3:
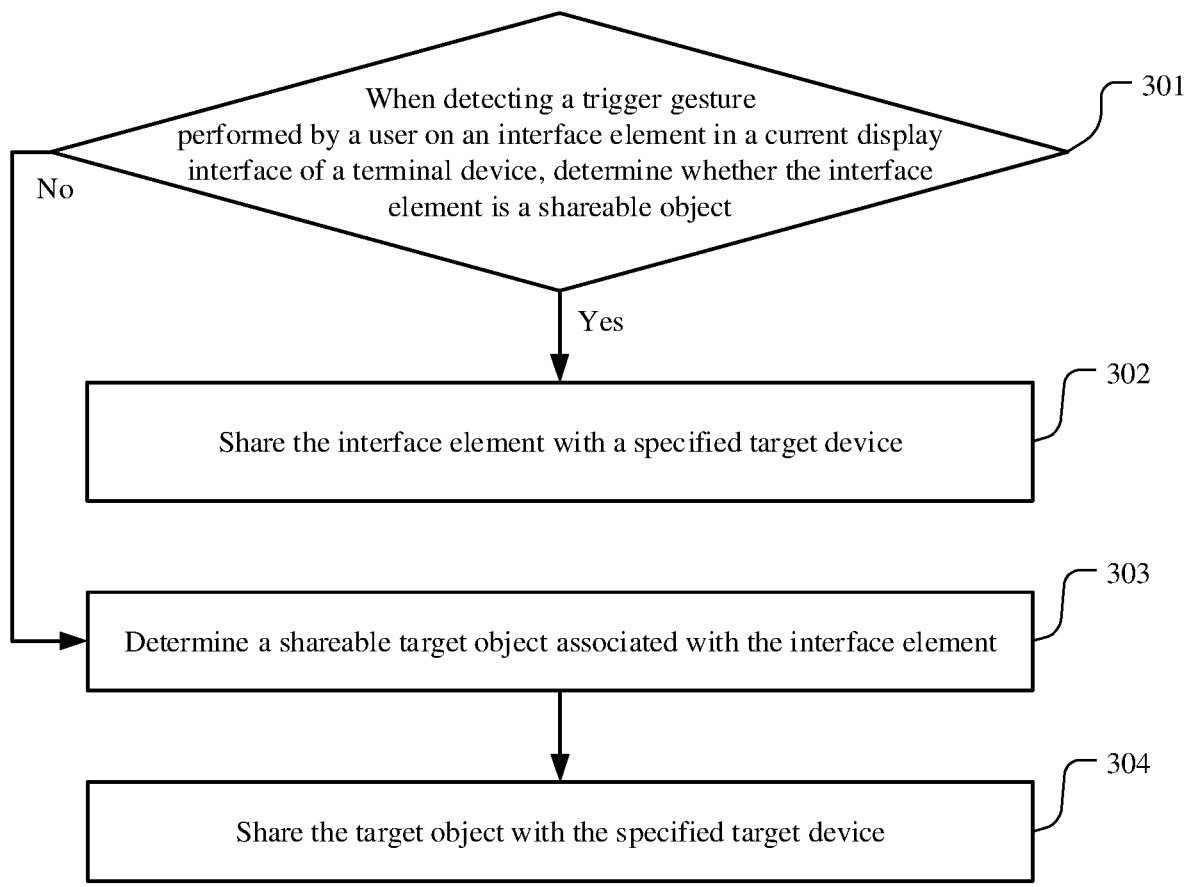
FIG. 3 is a flowchart of an information sharing method according to an embodiment of this application.

FIG. 3 is a flowchart of an information sharing method according to an embodiment of this application. The method includes the following steps.

301: When detecting a trigger gesture performed by a user on an interface element in a current display interface of a terminal device, determine whether the interface element is a shareable object.

In this embodiment of this application, the user may enter a gesture in the current display interface of the terminal device to trigger an interface element. After detecting the gesture, the terminal device determines whether the interface element is a shareable object. The trigger gesture may be double tapping by one finger, tapping and holding by one finger, tapping by two fingers, tapping and holding by two fingers, pinching after tapping and holding by two fingers, or the like. A specific type of the gesture is not limited in this application. The terminal device may detect, through the touchscreen, various gestures inputted by the user; and if detecting a specific gesture (for example, pinching after tapping and holding by two fingers) inputted, obtain an interface element associated with the gesture, and determine whether the interface element is a shareable object.

In the display interface of the terminal device, interface elements generally include application program icons, various function keys, an opened image or web page, or the like. Some of these interface elements are shareable objects, for example, the opened image or web page; and some are unshareable objects, for example, the various function keys. The terminal device may determine, based on an attribute of the interface element triggered by the gesture of the user, whether the interface element is a shareable object. For example, if the interface element is an opened image or web page, the terminal device determines that the interface element is a shareable object; and if the interface element is a volume control button or a Wi-Fi switch, the terminal device determines that the interface element is an unshareable object.

If the interface element is a shareable object, step 302 is performed; if the interface element is an unshareable object, steps 303 and 304 are performed.

302: Share the interface element with a specified target device.

If the interface element is a shareable object, the interface element may be directly shared with the specified target device. The target device may be a device that is around the terminal device and that is selected by the user to receive information. For example, if the interface element triggered by a gesture made by the user in the current display interface of the terminal device is an image and the image is a shareable object, a list of target devices around the terminal device may be displayed in the interface of the terminal device, and the user selects one or more target devices from the list and shares the image with the one or more target devices selected by the user.

303: Determine a shareable target object associated with the interface element.

If the interface element is an unshareable object, the terminal device determines a shareable target object associated with the interface element. Specifically, a shareable object associated with each interface element in the display interface of the terminal device may be preset. For example, it is preset that an interface element A is associated with an object X and an interface element B is associated with an object Y. An association data table of the interface elements may be stored in a database. After detecting that a triggered interface element is an unshareable object, a terminal system may find a shareable object associated with the interface element from the association data table. In addition, a shareable object associated with an interface element may alternatively be determined based on factors such as an attribute, a purpose, and a background logic relationship of the interface element. For details, refer to the following embodiments.

304: Share the target object with the specified target device.

After determining the shareable target object associated with the interface element, the terminal device shares the target object with the specified target device. The target device may be one or more devices that are preset by the user and that are bound to the terminal device, or may be one or more devices that are to be shared with and that are selected by the user from a list of devices, around the terminal device, displayed on the terminal device. After the target device to be shared with is determined, the terminal device may send the target object to the target device in a manner of Bluetooth, Wi-Fi, or the like, to complete information sharing.

In this embodiment of this application, when sharing information, the user only needs to make a gesture on the current display interface of the terminal device to select an interface element, and a terminal system can find, based on a preset logical relationship of the interface element, the information object that the user intends to share, and share the object with a specified device. In the process, the user does not need to memorize or find an information sharing portal. Therefore, the operation efficiency of sharing information between devices can be improved.

Figure 4:
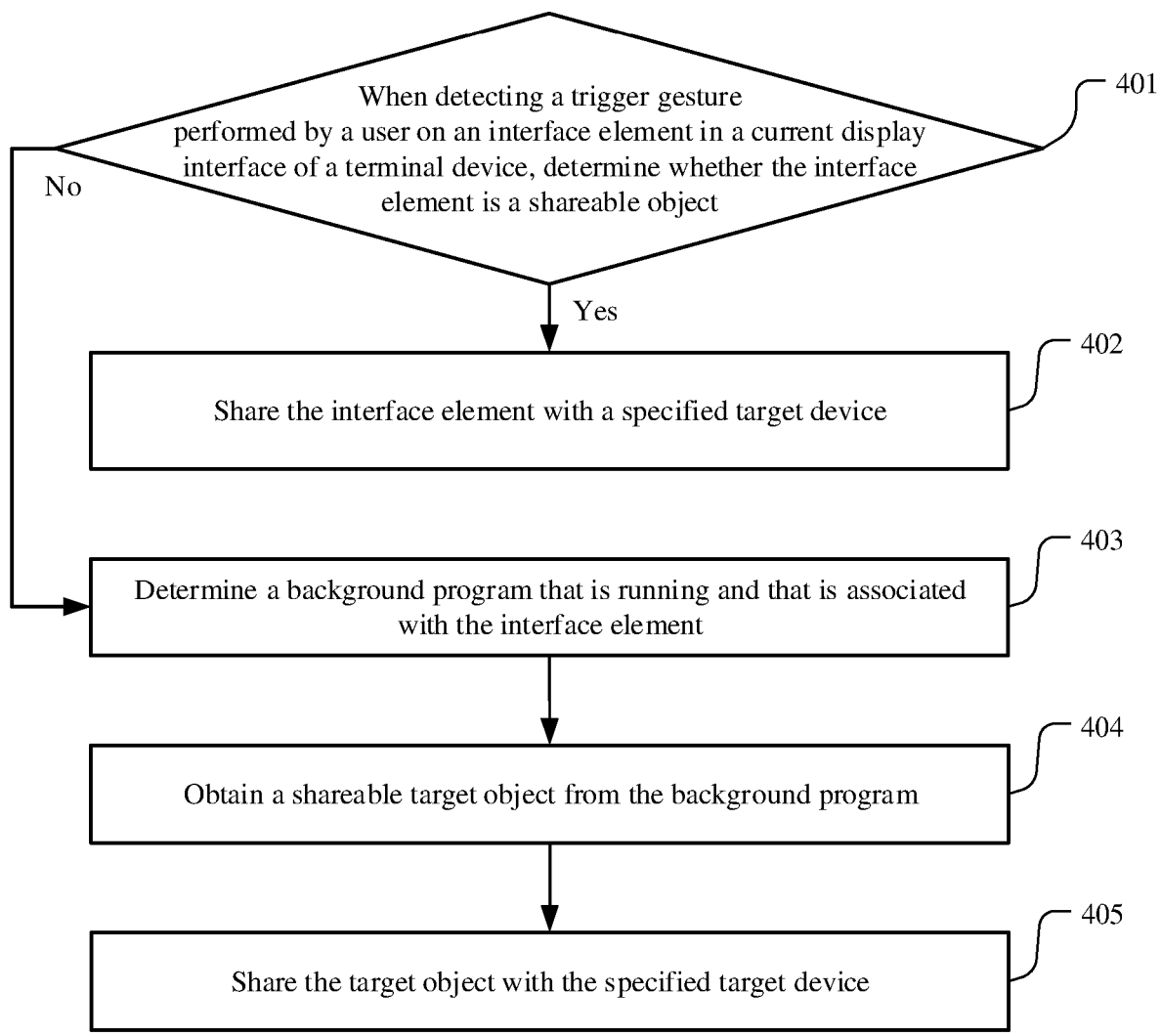
FIG. 4 is a flowchart of another information sharing method according to an embodiment of this application.

FIG. 4 is a flowchart of another information sharing method according to an embodiment of this application. The method includes the following steps.

401: When detecting a trigger gesture performed by a user on an interface element in a current display interface of a terminal device, determine whether the interface element is a shareable object.

If the interface element is a shareable object, step 402 is performed; if the interface element is an unshareable object, steps 403 to 405 are performed.

402: Share the interface element with a specified target device.

Steps 401 and 402 are the same as steps 301 and 302. For details, refer to the related descriptions about steps 301 and 302.

403: Determine a background program that is running and that is associated with the interface element.

If the interface element is an unshareable object, the terminal device determines a shareable target object associated with the interface element. In this embodiment of this application, to determine the target object associated with the interface element, the background program that is running and that is associated with the interface element needs to be determined first. For example, if the interface element is an icon of a background program X, it may be determined that the background program associated with the interface element is X; and if the interface element is a function key, it may be determined that a background program using the function key is the background program associated with the interface element.

Specifically, the determining a background program that is running and that is associated with the interface element may include:

(1) determining a system resource controlled by the interface element;

(2) searching for the background program that is running and that occupies the system resource; and (3) determining the found background program as the background program associated with the interface element.

Some button-type interface elements are usually used to control some system resources, and some background programs occupy these system resources exactly during running.

In this way, the interface elements are associated with the background programs. For example, an interface element triggered by a gesture is a volume slider, and a system resource controlled by the volume slider is media volume. In this case, a background program (for example, a media player) that is running and that occupies the media volume may be viewed as a background program associated with the interface element.

404: Obtain a shareable target object from the background program.

After determining the background program that is running and that is associated with the interface element, the terminal device may search the background program for the shareable target object. For example, if the background program associated with the interface element is a browser, a default home page link of the browser may be used as the shareable target object; and if the background program associated with the interface element is a media player, a media file that is being played by the media player may be used as the shareable target object.

Specifically, when the interface element is a volume slider and the background program associated with the volume slider is a media player, the obtaining the target object from the background program may include:

(1) obtaining a media file that is being played by the media player; and (2) determining the obtained media file as the target object.

For example, if a media player is a background program associated with the volume slider, and the media player is occupying the media volume to play a song X, the song X may be determined as a to-be-shared target object. Certainly, a previous song, a next song, or another song played by the media player may alternatively be used as the to-be-shared target object. This is not limited in this application.

Further, after the determining the media file as the target object, the method may further include:

(3) when detecting a screen projection operation, sending the media file to the target device in response to the screen projection operation, so that the target device displays and plays the media file; and (4) adjusting, based on the trigger gesture, volume for playing the media file on the target device.

If the target object is a media file, the terminal device may project the media file onto the target device for play. In addition, the user may further adjust the volume slider in the display interface of the terminal device by making the trigger gesture to adjust the volume for playing the media file on the target device. For example, a display interface of a mobile phone displays a volume slider, and the user may trigger the volume slider with a pinch gesture and project an audio file that is being played by the mobile phone onto a large-screen television around the mobile phone for play. In addition, the user may further control the volume slider in the display interface of the mobile phone with a pinch gesture, and the mobile phone sends a corresponding volume adjustment instruction to the large-screen television to adjust the volume for playing the audio file on the large-screen television.

405: Share the target object with the specified target device.

Step 405 is the same as step 304. For details, refer to the related description about step 304.

In this embodiment of this application, when the trigger gesture performed by the user on an interface element in the current display interface of the terminal device is detected, whether the interface element is a shareable object is determined; if the interface element is an unshareable object, the background program that is running and that is associated with the interface element is determined; the background program is searched for the shareable target object; and the target object is shared with the specified target device. Compared with the foregoing embodiment of this application, this embodiment provides a specific manner for determining a target object associated with an interface element.

Figure 5:
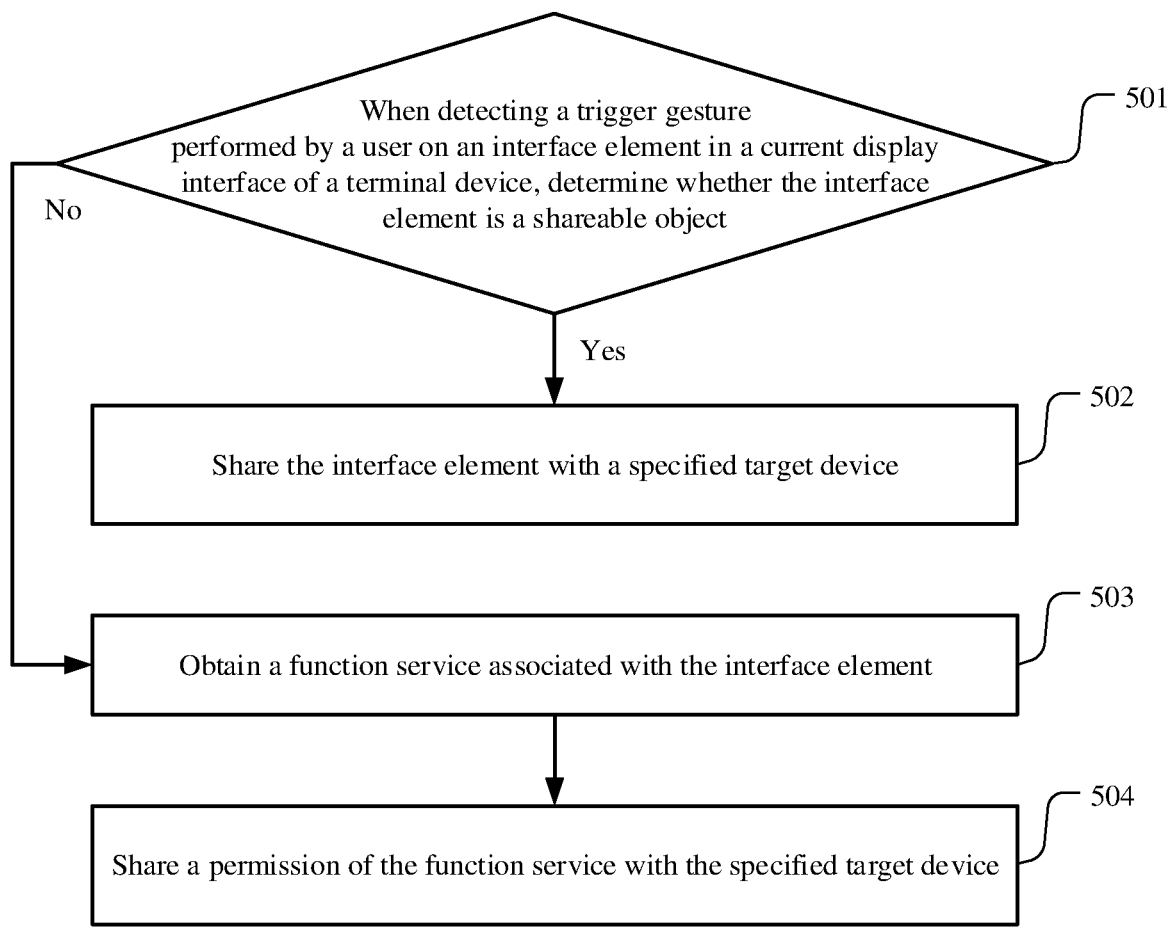
FIG. 5 is a flowchart of another information sharing method according to an embodiment of this application.

FIG. 5 is a flowchart of another information sharing method according to an embodiment of this application. The method includes the following steps.

501: When detecting a trigger gesture performed by a user on an interface element in a current display interface of a terminal device, determine whether the interface element is a shareable object.

If the interface element is a shareable object, step 502 is performed; if the interface element is an unshareable object, steps 503 and 504 are performed.

502: Share the interface element with a specified target device.

Steps 501 and 502 are the same as steps 301 and 302. For details, refer to the related descriptions about steps 301 and 302.

503: Obtain a function service associated with the interface element.

If the interface element is an unshareable object, the terminal device determines a shareable target object associated with the interface element. In this embodiment of this application, to determine the target object associated with the interface element, the function service associated with the interface element is obtained first. Some particular interface elements are associated with some function services. For example, if the interface element is a Wi-Fi switch, a function service associated with the interface element is a Wi-Fi network; and if the interface element is a network switch of a mobile phone, a function service associated with the interface element is a 4G/5G network.

504: Share a permission of the function service with the specified target device.

After the function service associated with the interface element is determined, the permission of the function service is shared with the specified target device. Specifically, target devices, around the terminal device, that have not joined in the function service may be displayed on the display interface of the terminal device. Then, the user selects one or more target devices from the target devices and shares the permission of the function service with the selected one or more target devices.

Particularly, when the interface element is a switch of a wireless network, the sharing the permission of the function service with the specified target device may include:

(1) obtaining a shared whitelist of the wireless network to which the terminal device is connected; and (2) adding the target device to the shared whitelist of the wireless network.

When the interface element is a Wi-Fi switch on a control panel of the device, it indicates to share, with the specified target device, the permission of accessing a wireless network to which the terminal device is connected. In this case, the terminal device obtains a shared whitelist of the wireless network to which the terminal device is connected, and then adds, to the shared whitelist of the wireless network, a name or a user account of the target device that is not connected to the wireless network and that is selected by the user, where the target device is around the terminal device. Then, the target device can be connected to the wireless network without password.

In this embodiment of this application, when the trigger gesture performed by the user on an interface element in the current display interface of the terminal device is detected, whether the interface element is a shareable object is determined; if the interface element is an unshareable object, the function service associated with the interface element is obtained; and the permission of the function service is shared with the specified target device. Compared with the foregoing embodiment of this application, this embodiment provides another specific manner for determining a target object associated with an interface element.

Figure 6:
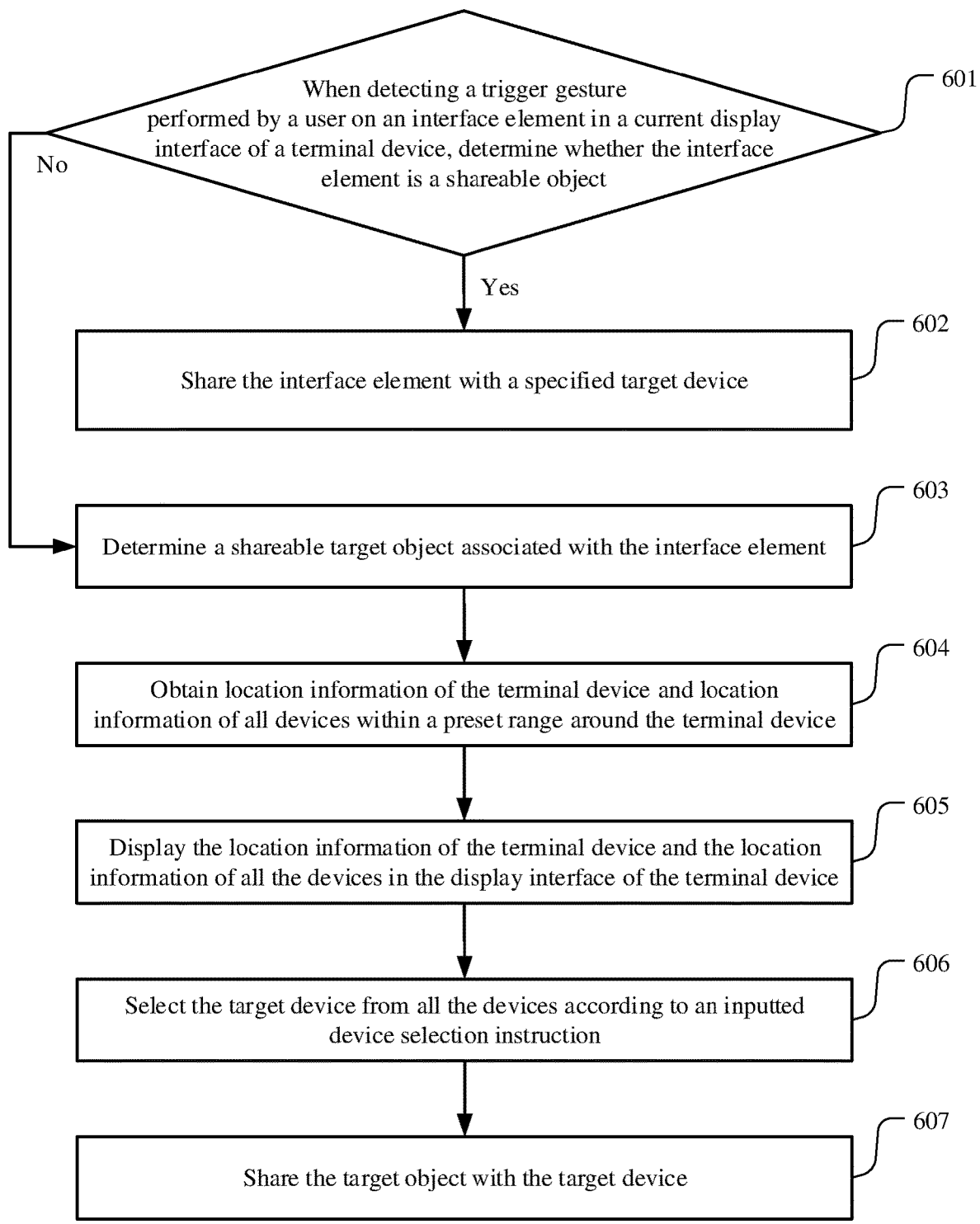
FIG. 6 is a flowchart of another information sharing method according to an embodiment of this application.

FIG. 6 is a flowchart of another information sharing method according to an embodiment of this application. The method includes the following steps.

601: When detecting a trigger gesture performed by a user on an interface element in a current display interface of a terminal device, determine whether the interface element is a shareable object.

If the interface element is a shareable object, step 602 is performed; if the interface element is an unshareable object, steps 603 to 607 are performed.

602: Share the interface element with a specified target device.

603: Determine a shareable target object associated with the interface element.

Steps 601 to 603 are the same as steps 301 to 303. For details, refer to the related descriptions about steps 301 to 303.

604: Obtain location information of the terminal device and location information of all devices within a preset range around the terminal device.

After determining the shareable target object associated with the interface element, the terminal device obtains the location information of the terminal device and the location information of all the devices within the preset range around the terminal device. During actual operation, location information of various devices may be obtained by using various short-range wireless positioning technologies. These technologies are widely applied to indoor positioning scenarios. At present, common short-range positioning technologies mainly include manners such as WLAN positioning, RFID positioning, UWB positioning, Bluetooth positioning, and ultrasonic positioning.

Preferably, this application a UWB (Ultra WideB and) technology may be used for positioning in this application. The UWB technology greatly differs from a conventional communication technology. The UWB technology does not use carriers in a conventional communication system. Instead, the UWB technology transmits data by sending and receiving extremely narrow pulses of nanosecond or sub-nanosecond duration, so that it has a bandwidth on the order of GHz. The UWB indoor positioning technology may be used for accurate indoor positioning and navigation in various fields, and has advantages of strong penetration, low power consumption, good anti-multipath effect, high security, low system complexity, and high positioning accuracy.

605: Display the location information of the terminal device and the location information of all the devices in the display interface of the terminal device.

After the location information of the terminal device and the location information of all the devices within the preset range around the terminal device are obtained, the location information may be displayed in the display interface of the terminal device. Specifically, a real-time device distribution location interface may be created, the terminal device is used as the center of the interface, and locations of the devices around the terminal device are displayed around the center. The user can directly view the devices around the terminal device and relatively positional relationships between these devices and the terminal device in the interface. In this way, the time that the user spends to search for the target device can be shortened.

606: Select the target device from all the devices according to an inputted device selection instruction.

Then, the terminal device selects the target device from all the devices according to the inputted device selection instruction. The user may select one or more target devices by tapping corresponding one or more device icons in the display interface of the terminal device.

607: Share the target object with the target device.

After the user selects the target device in the display interface of the terminal device, the terminal device may share the target object with the target device selected by the user.

In this embodiment of this application, when the trigger gesture performed by the user on an interface element in the current display interface of the terminal device is detected, whether the interface element is a shareable object is determined; if the interface element is an unshareable object, a shareable target object associated with the interface element is determined; the location information of the terminal device and the location information of all the devices within the preset range around the terminal device are obtained; the location information of the terminal device and the location information of all the devices are displayed in the display interface of the terminal device; the target device is selected from all the devices according to the inputted device selection instruction; and the target object is shared with the target device. Compared with the foregoing embodiments of this application, this embodiment provides a specific manner for obtaining a location of a nearby device and determining a target device, thereby shortening the time that the user spends to search for the target device, and improving information sharing efficiency.

It should be understood that a sequence number of each step in the foregoing embodiments does not mean an execution sequence. The execution sequence of each process should be determined based on a function and internal logic of the process, and shall not constitute any limitation on the implementation process of the embodiments of this application.

For ease of understanding, the information sharing method provided in this application is described below by using several actual application scenarios.

Figure 7A:
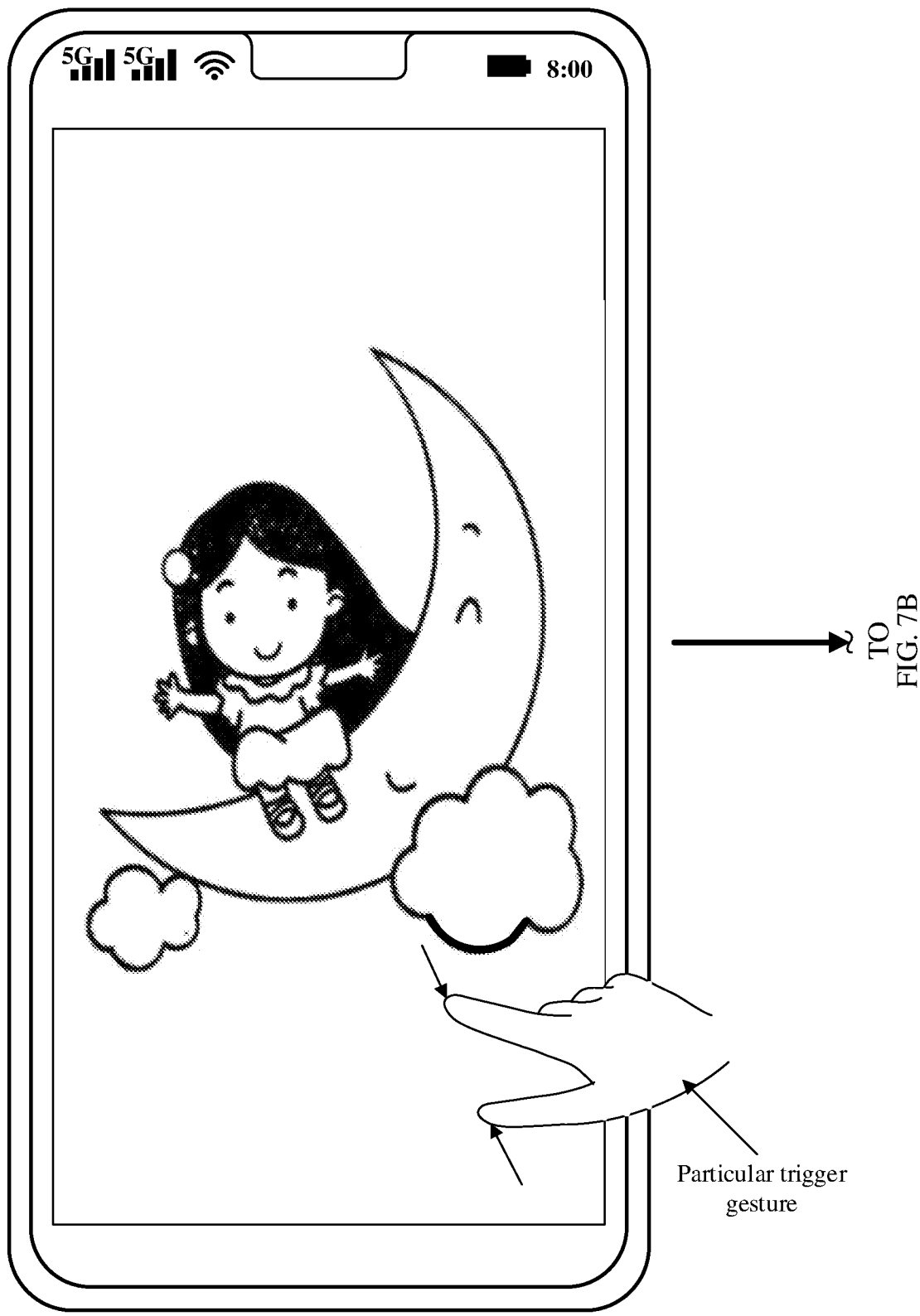
FIG. 7A and FIG. 7B are a schematic diagram of operations of sharing an image opened on a mobile phone with another device according to an embodiment of this application.
Figure 7B:
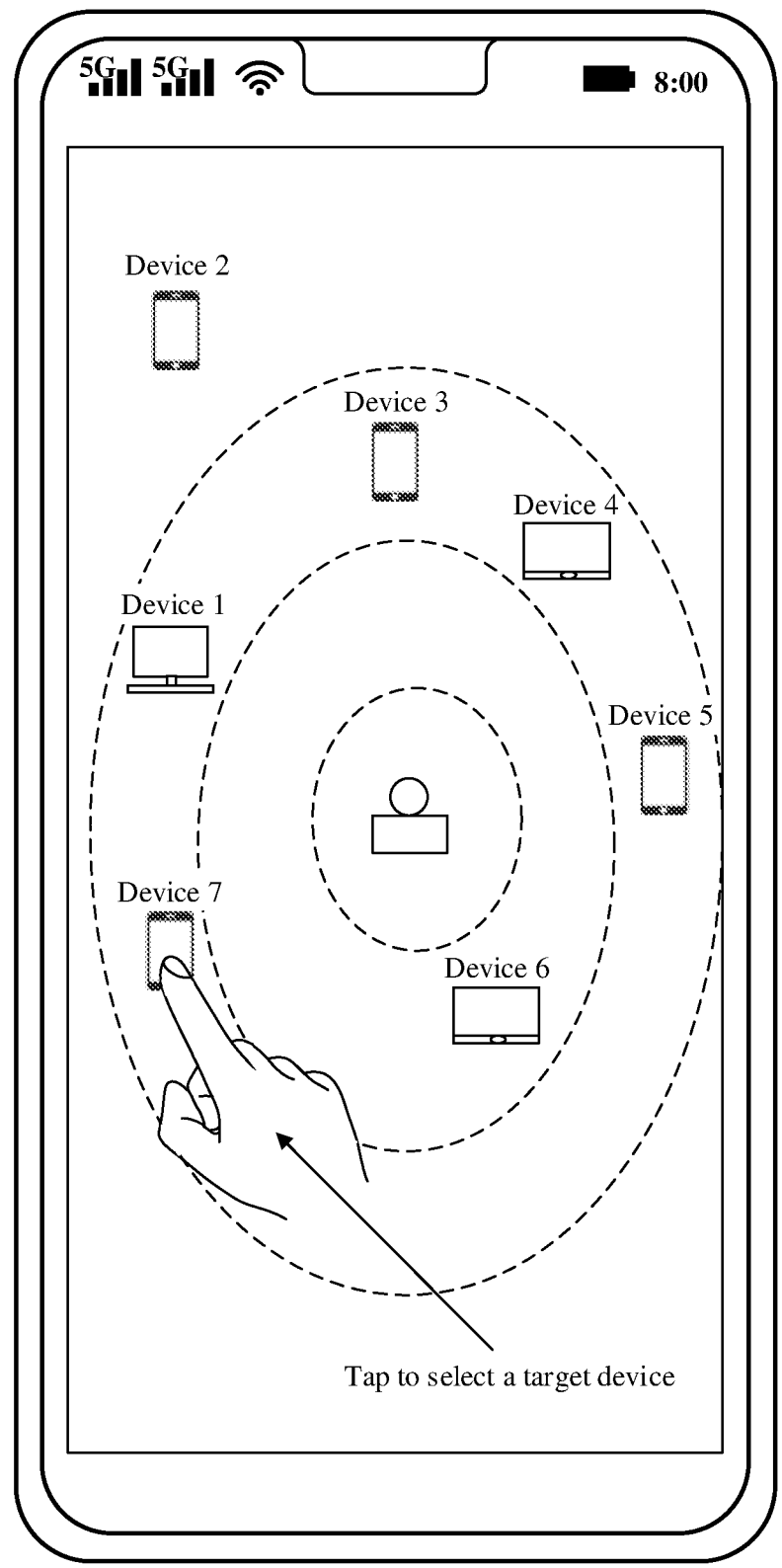

Scenario 1 is shown in FIG. 7A and FIG. 7B, which are a schematic diagram of operations of sharing an image opened on a mobile phone with another device according to an embodiment of this application.

A current display interface of the mobile phone displays an opened image. When a user wants to share the image with another nearby device, the user may trigger the image with a particular gesture. In this scenario, a particular gesture of tapping and holding and pinching with two fingers is used. After detecting the particular gesture, the mobile phone determines whether an interface element triggered by the gesture is a shareable object. In this scenario, the interface element triggered by the gesture is a sharable image. Therefore, the image is directly used as a to-be-shared object. Then, the mobile phone detects locations of nearby devices, and the locations of the nearby devices are displayed in the interface of the mobile phone. The user taps to select the target device, with which the image is to be shared, in the interface of the mobile phone. Then, the mobile phone sends, in a manner of Wi-Fi or Bluetooth, the image to the target device selected by the user. In this way, the information object is shared conveniently.

Figure 8A:
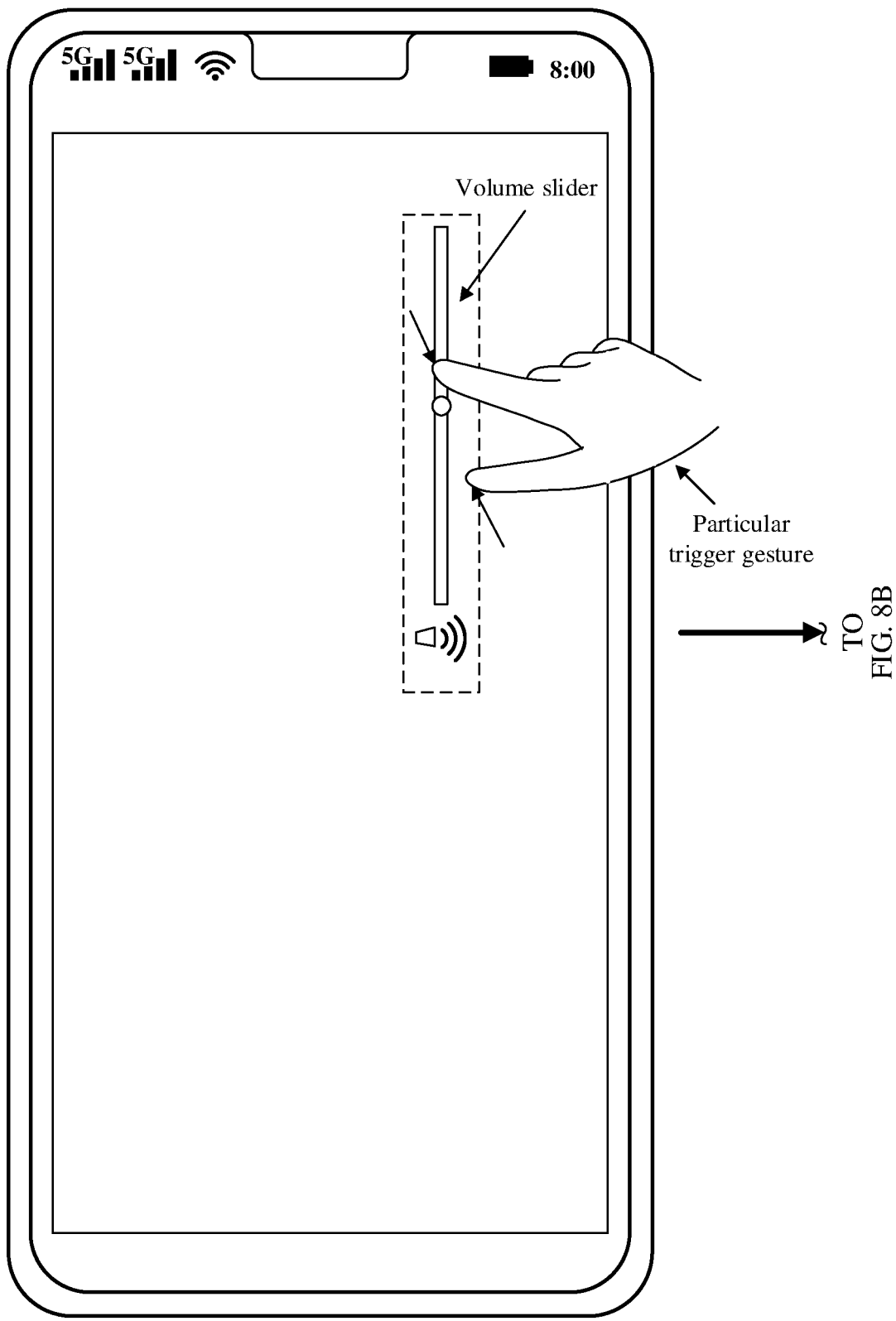
FIG. 8A, FIG. 8B, and FIG. 8C are a schematic diagram of operations of sharing a media file played in a background of a mobile phone with another device according to an embodiment of this application.
Figure 8B:
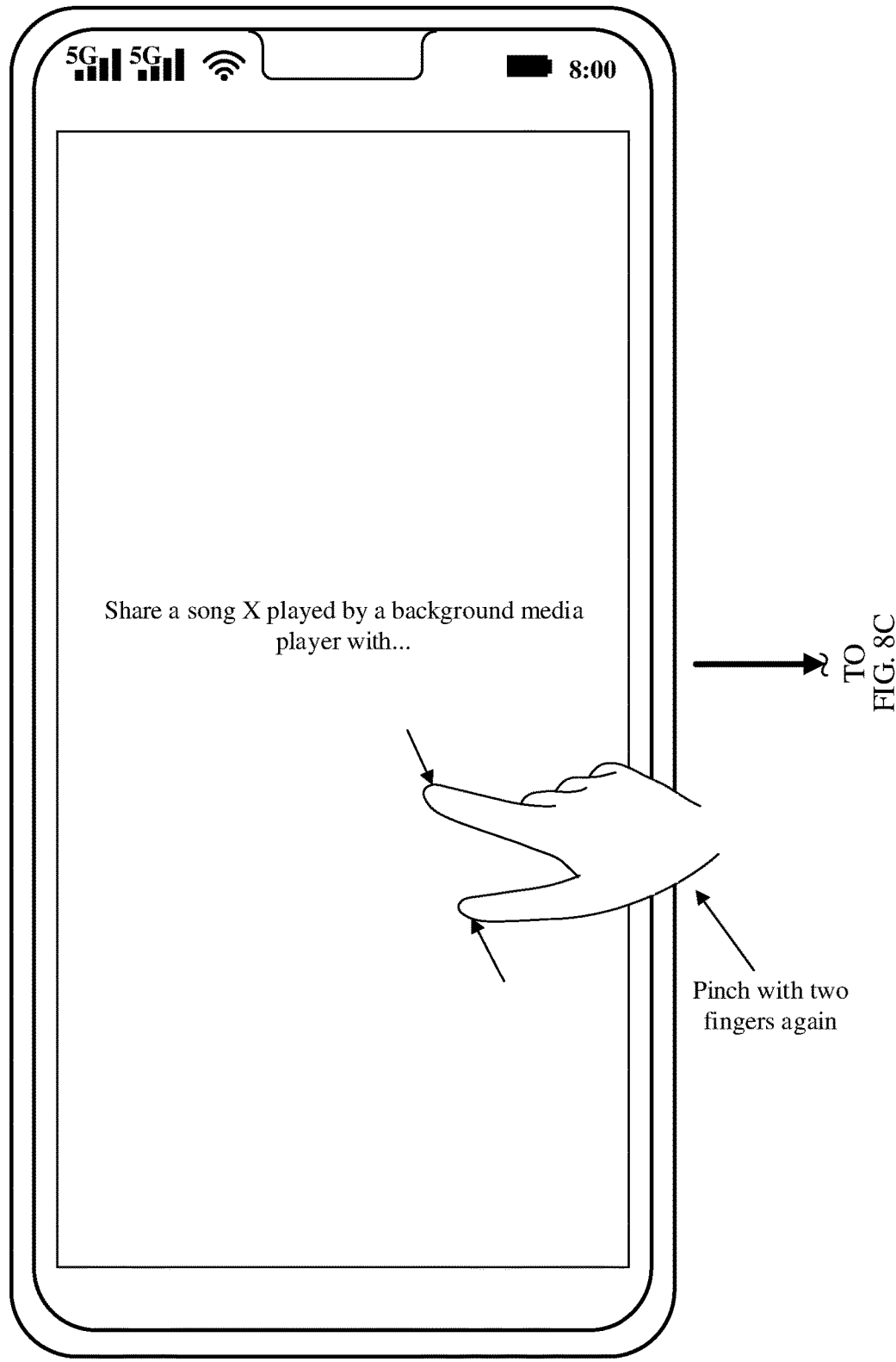
Figure 8C:
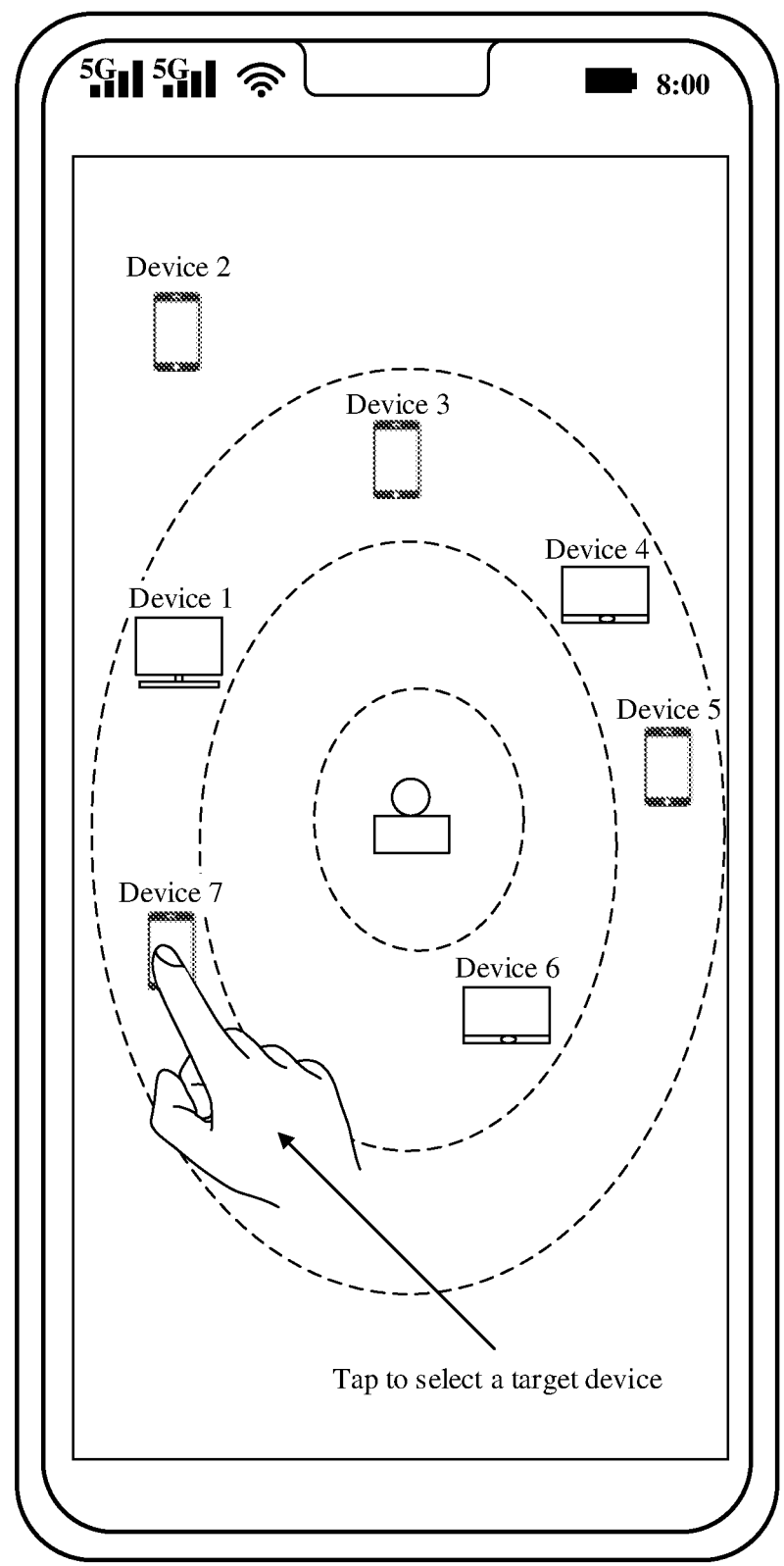

Scenario 2 is shown in FIG. 8A, FIG. 8B, and FIG. 8C, which are a schematic diagram of operations of sharing a media file played in a background of a mobile phone with another device according to an embodiment of this application.

A background media player of the mobile phone is playing a song X, and a current display interface displays a screen with a volume slider opened. When a user wants to share the song X with another nearby device, the user may trigger the volume slider with a particular gesture. Similarly, the particular gesture may be a particular gesture of tapping and holding and pinching with two fingers. After detecting the particular gesture, the mobile phone determines whether an interface element triggered by the gesture is a shareable object. In this scenario, the interface element triggered by the gesture is the volume slider, which is an unshareable object. In this case, the mobile phone finds a corresponding shareable target object based on a background program of the volume slider or a logic relationship. Specifically, a system resource controlled by the volume slider is media volume, and the media volume is being occupied by the media player to play the audio (the song X). Therefore, it can be found based on this logic relationship that the to-be-shared target object is the song X. After the to-be-shared song X is found, the song X or indication information (as shown in the middle interface of the mobile phone in FIG. 8B) that the song X has been selected as the to-be-shared object may be displayed on the interface of the mobile phone. Then, the user may make the pinch gesture with two fingers again, and the mobile phone detects locations of nearby devices, and the locations of the nearby devices are displayed in the interface of the mobile phone. The user taps to select the target device, with which the song is to be shared, in the interface of the mobile phone. Then, the mobile phone sends, in a manner of Wi-Fi or Bluetooth, the song X to the target device selected by the user. In this way, the information object is shared conveniently. In addition, in this manner, the song X can further be projected onto the target device for play, and the user may further control the volume slider in the display interface of the mobile phone with a pinch gesture to adjust the volume for playing the song X on the target device.

Figure 9A:
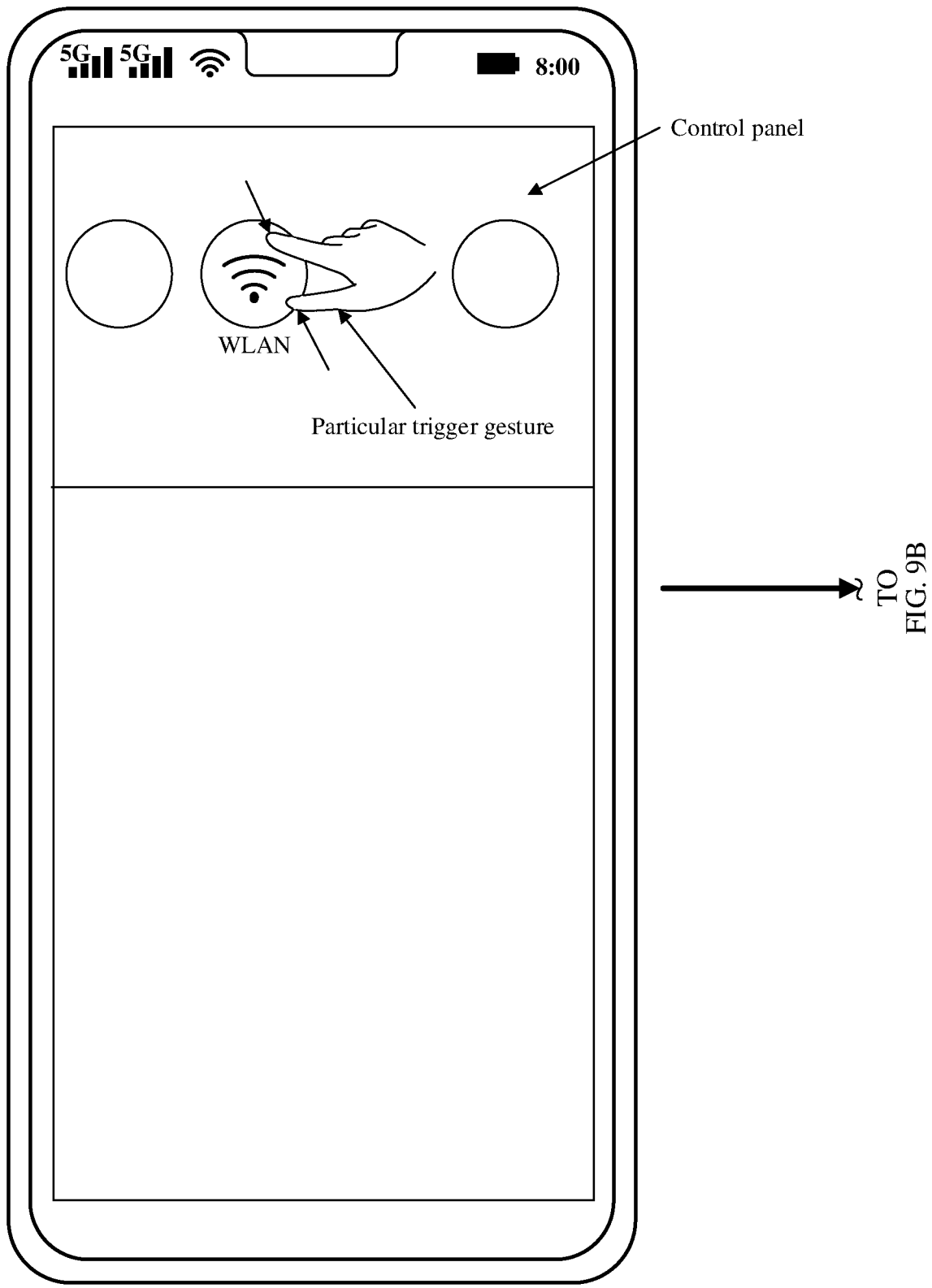
FIG. 9A and FIG. 9B are a schematic diagram of operations of sharing a wireless network accessed by a mobile phone with another device according to an embodiment of this application.
Figure 9B:
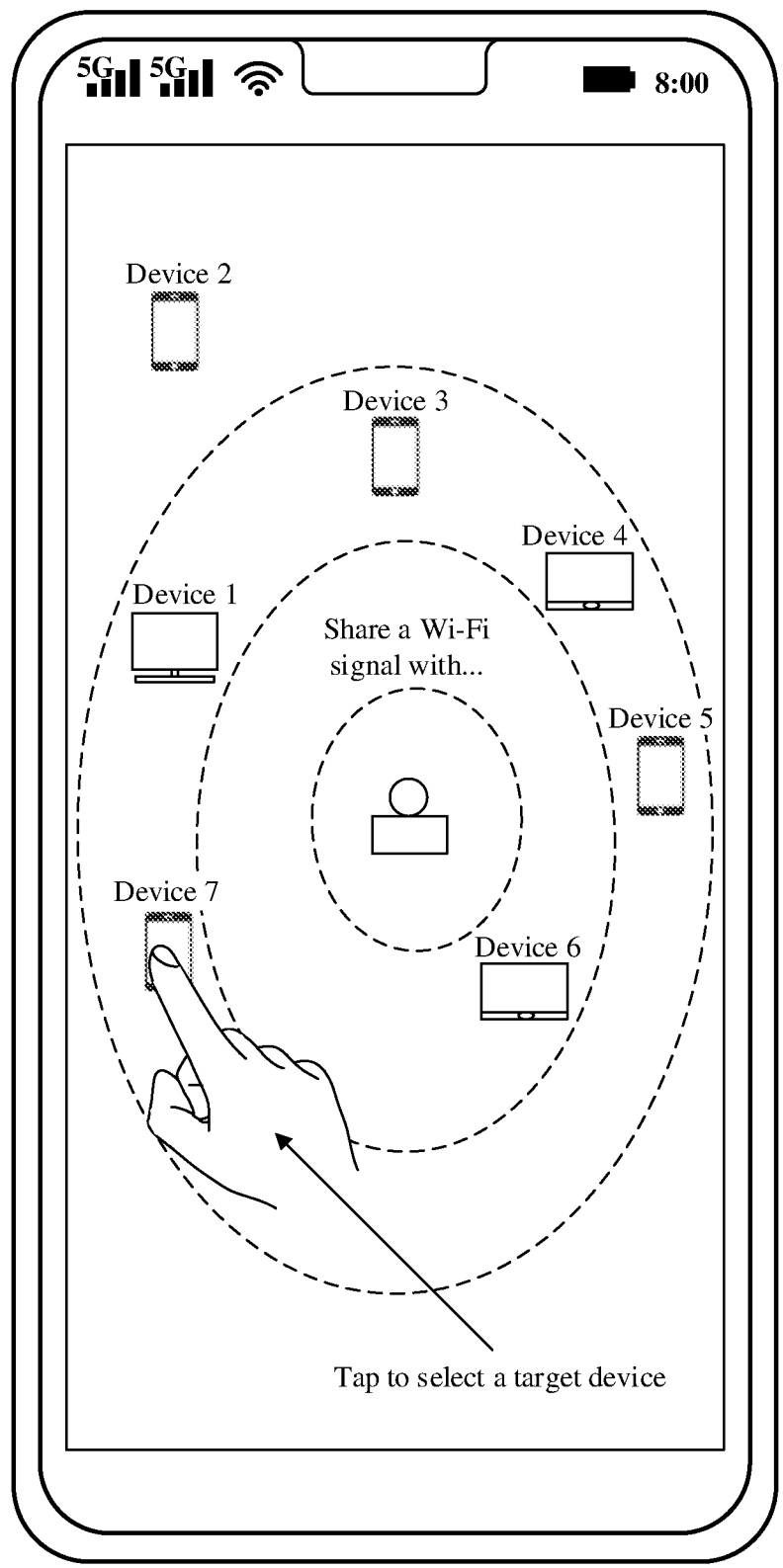

Scenario 3 is shown in FIG. 9A and FIG. 9B, which are a schematic diagram of operations of sharing a wireless network accessed by a mobile phone with another device according to an embodiment of this application.

A current display interface of the mobile phone displays a control panel. When a user wants to share the wireless network of the mobile phone with another nearby device, the user may trigger a WLAN button (that is, a Wi-Fi switch) on the control panel with a particular gesture. Similarly, the particular gesture may be a particular gesture of tapping and holding and pinching with two fingers. After detecting the particular gesture, the mobile phone determines whether an interface element triggered by the gesture is a shareable object. In this scenario, the interface element triggered by the gesture is the WLAN button, which is an unshareable object. In this case, the mobile phone finds a corresponding shareable target object based on a background program of the WLAN button or a logic relationship. Specifically, a function service associated with the WLAN button is the wireless network. Therefore, a permission of the wireless network may be used as the to-be-shared object. Then, the mobile phone detects locations of nearby devices, and the locations of the nearby devices are displayed in the interface of the mobile phone. In addition, the interface of the mobile phone may alternatively displays only locations of devices not connected to Wi-Fi. The user taps to select a target device, with which the wireless network of the mobile phone is to be shared, in the interface of the mobile phone. Then, the mobile phone adds a name or a user account of the target device to a shared whitelist of the wireless network. The target device can be connected to the wireless network without password.

Figure 10A:
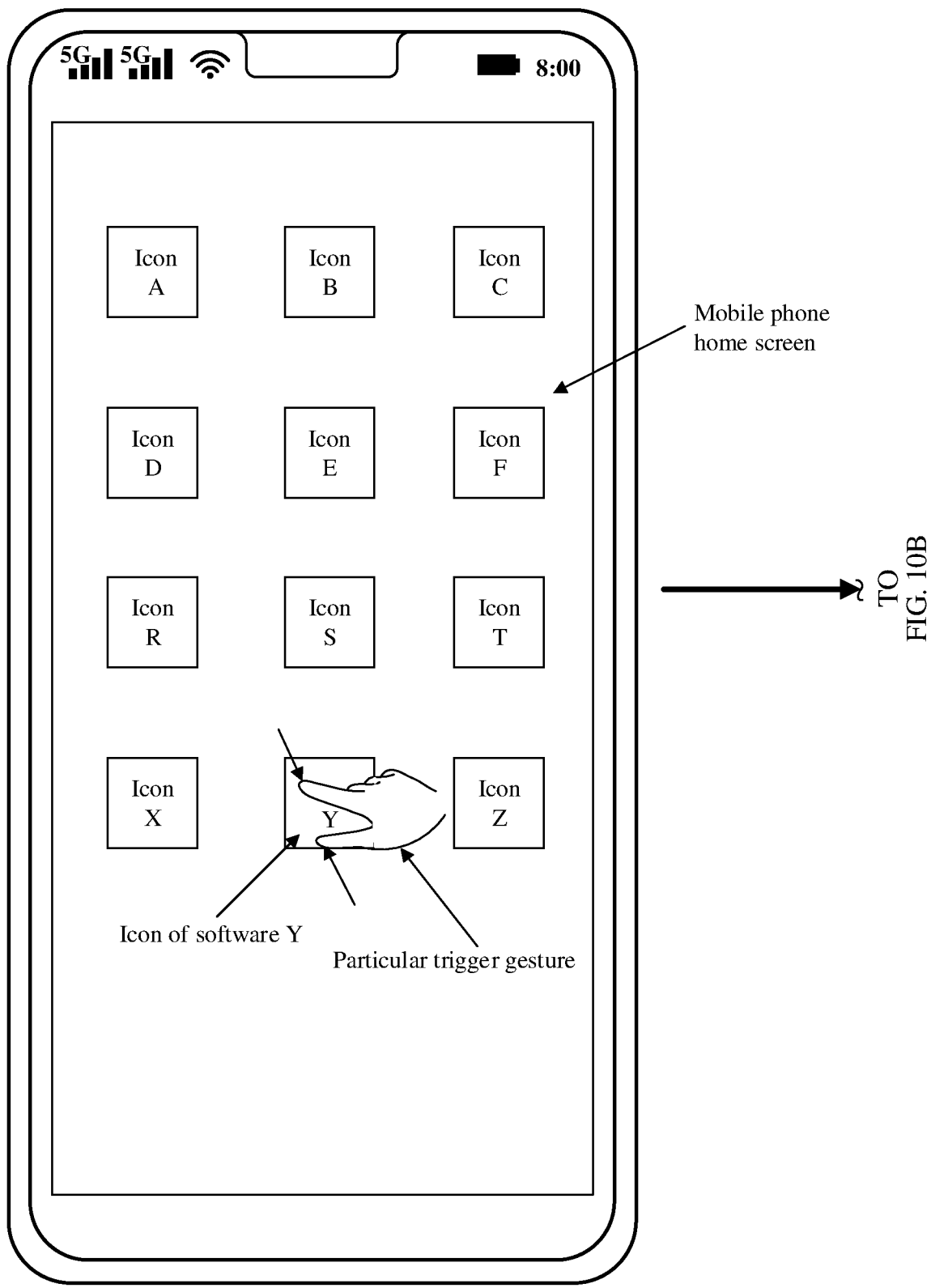
FIG. 10A and FIG. 10B are a schematic diagram of operations of sharing a software installation package on a mobile phone with another device according to an embodiment of this application.
Figure 10B:
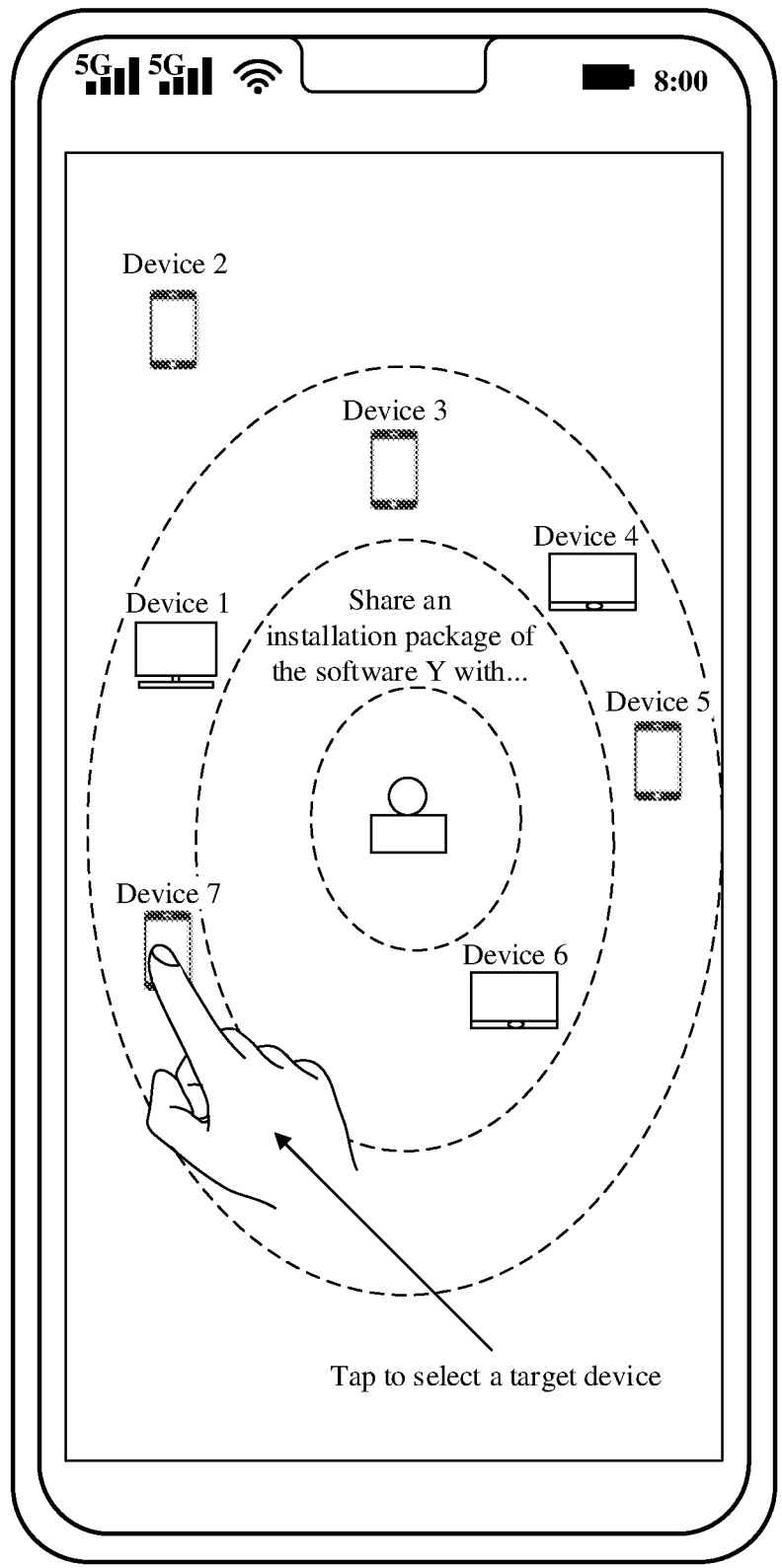

Scenario 4 is shown in FIG. 10A and FIG. 10B, which are a schematic diagram of operations of sharing a software installation package on a mobile phone with another device according to an embodiment of this application.

A current display interface of the mobile phone displays a home screen of the mobile phone. When a user wants to share an installation package of software Y on the mobile phone with another nearby device, the user may trigger an icon of the software Y on the home screen of the mobile phone with a particular gesture. Similarly, the particular gesture may be a particular gesture of tapping and holding and pinching with two fingers. After detecting the particular gesture, the mobile phone determines whether an interface element triggered by the gesture is a shareable object. In this scenario, the interface element triggered by the gesture is the software icon, which is an unshareable object. In this case, the mobile phone finds a corresponding shareable target object based on a background program of the software icon or a logic relationship. Specifically, an object associated with the software icon may be a corresponding software installation package. Therefore, the mobile phone determines the installation package of the software Y as the to-be-shared target object. Then, the mobile phone detects locations of nearby devices, and the locations of the nearby devices are displayed in the interface of the mobile phone. The user taps to select the target device, with which the software installation package is to be shared, in the interface of the mobile phone. Then, the mobile phone sends, in a manner of Wi-Fi or Bluetooth, the installation package of the software Y to the target device selected by the user.

Figure 11:
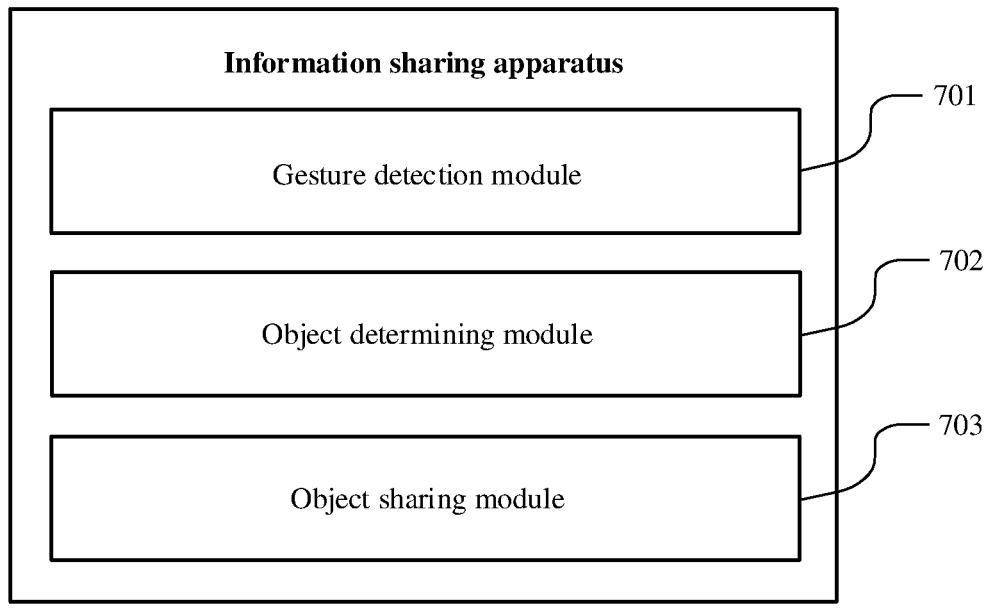
FIG. 11 is a structural block diagram of an information sharing apparatus according to an embodiment of this application.

In correspondence with the information sharing methods provided in the foregoing embodiments, FIG. 11 is a schematic structural diagram of an information sharing apparatus according to an embodiment of this application. For ease of description, only the parts related to this embodiment of this application are shown.

As shown in FIG. 11, the apparatus includes:

a gesture detection module 701, configured to: when detecting a trigger gesture performed by a user on an interface element in a current display interface of the terminal device, determine whether the interface element is a shareable object;

an object determining module 702, configured to: if the interface element is an unshareable object, determine a shareable target object associated with the interface element; and an object sharing module 703, configured to share the target object with a specified target device.

Further, the object determining module may include:

a background program determining unit, configured to determine a background program that is running and that is associated with the interface element; and a target object search unit, configured to obtain the target object from the background program.

Further, the background program determining unit may include:

a system resource determining sub unit, configured to determine a system resource controlled by the interface element;

a background program search sub unit, configured to search for the background program that is running and that occupies the system resource; and a background program determining sub unit, configured to determine the found background program as the background program associated with the interface element.

Further, when the interface element is a volume slider and the background program associated with the volume slider is a media player, the target object search unit may include:

a media file obtaining sub unit, configured to obtain a media file that is being played by the media player; and a target object determining sub unit, configured to determine the obtained media file as the target object.

Still further, the object sharing module may include:

a file play unit, configured to: when detecting a screen projection operation, send the media file to the target device in response to the screen projection operation, so that the target device displays and plays the media file.

Further, the object determining module may include:

a function service obtaining unit, configured to obtain a function service associated with the interface element; and a target object determining unit, configured to determine a permission of the function service as the target object.

Further, the object sharing module may include:

a whitelist obtaining unit, configured to obtain a shared whitelist of the wireless network to which the terminal device is connected; and a device adding unit, configured to add the target device to the shared whitelist of the wireless network.

Further, the information sharing apparatus may further include:

a location information obtaining module, configured to obtain location information of the terminal device and location information of all devices within a preset range around the terminal device;

a location information display module, configured to display the location information of the terminal device and the location information of all the devices in the display interface of the terminal device; and a target device determining module, configured to select the target device from all the devices according to an inputted device selection instruction.

Further, the information sharing apparatus may further include:

an interface element sharing module, configured to: if the interface element is a shareable object, share the interface element with the target device.

An embodiment of this application further provides a computer-readable storage medium. The computer-readable storage medium stores a computer program. When the computer program is executed by a processor, the information sharing methods provided in this application are implemented.

An embodiment of this application further provides a computer program product. When the computer program product is run on a terminal device, the terminal device is enabled to perform the information sharing methods provided in this application.

Figure 12:
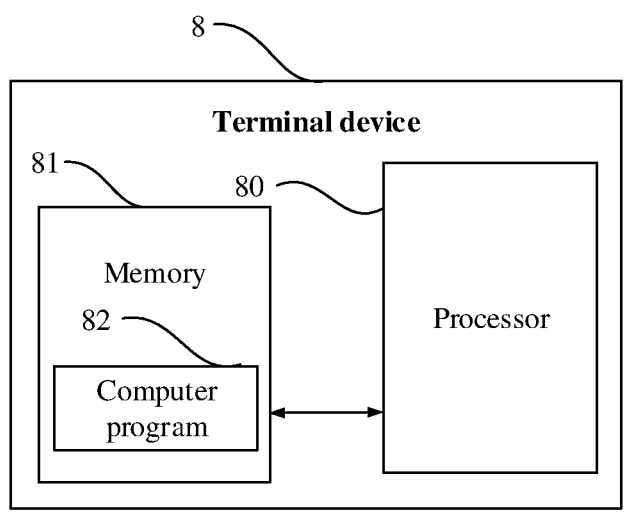
FIG. 12 is a schematic diagram of a terminal device according to an embodiment of this application.

FIG. 12 is a schematic diagram of a terminal device according to an embodiment of this application. As shown in FIG. 12, the terminal device 8 in this embodiment includes: at least one processor 80 (only one processor is shown in FIG. 12), a memory 81, and a computer program 82 that is stored in the memory 81 and that can be run on the at least one processor 80. When the processor 80 executes the computer program 82, the steps of the information sharing method in any one of the foregoing embodiments are implemented.

The terminal device may include but is not limited to the processor 80 and the memory 81. A person skilled in the art may understand that FIG. 12 is merely an example of the terminal device 8 and does not constitute any limitation on the terminal device 8. The terminal device 8 may include more or fewer components than those shown in the figure, or some components may be combined, or different components may be used. For example, the terminal device 8 may further include an input/output device, a network access device, and the like.

The processor 80 may be a central processing unit (Central Processing Unit, CPU), another general-purpose processor, a digital signal processor (Digital Signal Processor, DSP), an application-specific integrated circuit (Application Specific Integrated Circuit, ASIC), a field-programmable gate array (Field-Programmable Gate Array, FPGA) or another programmable logic device, a discrete gate or transistor logic device, a discrete hardware component, or the like. The general-purpose processor may be a microprocessor, any conventional processor, or the like.

In some embodiments, the memory 81 may be an internal storage unit of the terminal device 8, for example, a hard disk or an inner memory of the terminal device 8. In some other embodiments, the memory 81 may alternatively be an external storage device of the terminal device 8, for example, a plug-connected hard disk equipped for the terminal device 8, a smart media card (Smart Media Card, SMC), a secure digital (Secure Digital, SD) card, or a flash card (Flash Card). Further, the memory 81 may alternatively include bot an internal storage unit and an external storage device of the terminal device 8. The memory 81 is configured to store an operation apparatus, an application program, a bootloader (BootLoader), data, and another program such as program code of the computer program. The memory 81 may further be configured to temporarily store data that has been outputted or that is to be outputted.

A person skilled in the art may be aware that, for ease and brevity of description, the foregoing division of the functional units and modules is merely an example. During actual application, the foregoing functions may be allocated as required to different functional units and modules for implementation, that is, the inner structure of the apparatus is divided into different functional units or modules to implement all or some of the foregoing functions. The functional units or modules in the embodiments may be integrated into one processing unit or may exist as individual physical units, or two or more units may be integrated into one unit. The integrated unit may be implemented in a form of hardware, or may be implemented in a form of a software functional unit. In addition, specific names of the functional units or modules are merely for distinction, and are not intended to limit the protection scope of this application. For specific working processes of the units and modules in the foregoing apparatus, refer to the corresponding processes in the foregoing method embodiments. Details are not described herein again.

In the foregoing embodiments, the description of each embodiment has its own emphasis. For parts that are not described or recorded in detail in one embodiment, refer to the relevant descriptions of another embodiment.

A person of ordinary skill in the art may be aware that the units and algorithm steps of each example described with reference to the embodiments disclosed herein can be implemented in electronic hardware or a combination of computer software and electronic hardware. Whether these functions are performed in a manner of hardware or software depends on a specific application and a design constraint of a technical solution. A person skilled in the art can a use different method for each specific application to implement a described function, but this shall not be considered as departing from the scope of this application.

It should be understood that the apparatuses and methods disclosed in the embodiments provided in this application may be implemented in other manners. For example, the foregoing apparatus embodiment is merely an example. For example, the division of the modules or units is merely logical division, and during actual implementation, other division manners may exist. For example, a plurality of units or components may be combined or integrated into another apparatus, or some features may be ignored or not performed. In addition, the shown or discussed mutual couplings or direct couplings or communication connections may be implemented through some interfaces, apparatuses, or units, and may be implemented in electrical, mechanical, or other forms.

The units described as separate components may or may not be physically separated, and the components shown as units may or may not be physical units, that is, may be located in one place, or may be distributed on a plurality of network elements. Some or all of the units may be selected based on actual requirements to achieve the objectives of the solutions in the embodiments.

In addition, the functional units or modules in the embodiments of this application may be integrated into one processing unit or may exist as individual physical units, or two or more units may be integrated into one unit. The integrated unit may be implemented in a form of hardware, or may be implemented in a form of a software functional unit.

When implemented in a form of a software functional unit and sold and used as an independent product, the integrated unit may be stored in a computer-readable storage medium. Based on such an understanding, in this application, all or some procedures of the methods in the foregoing embodiments may be implemented by a computer program instructing related hardware. The computer program may be stored in a computer-readable storage medium. When the computer program is executed by a processor, the steps in the foregoing method embodiments can be implemented. The computer program includes computer program code. The computer program code may be source code, object code, or an executable file, or may be in some other intermediate forms. The computer-readable storage medium may include at least: any entity or apparatus capable of adding the computer program code to a terminal device, a recording medium, a computer memory, a read-only memory (ROM, Read-Only Memory), a random access memory (RAM, Random Access Memory), an electrical carrier signal, a telecommunication signal, and a software distribution medium, for example, a USB flash drive, a removable hard disk, a diskette, or a compact disc. In some jurisdictions, under legislation and patent practice, a computer-readable medium cannot be an electrical carrier signal or a telecommunications signal.

The foregoing embodiments are merely intended to describe the technical solutions of this application, rather than limit this application. Although this application is described in detail with reference to the foregoing embodiments, a person of ordinary skill in the art should understand that modifications can still be made to the technical solutions described in the foregoing embodiments or equivalent replacements can be made to some technical features thereof, without departing from the spirit and scope of the technical solutions of the embodiments of this application. All these modifications and equivalent replacements shall fall within the protection scope of this application.

What is claimed is:

1. An information sharing method, applied to a terminal device, wherein the method comprises:
   when detecting a trigger gesture performed by a user on an interface element in a display interface of the terminal device, determining whether the interface element is a shareable object;
   if the interface element is an unshareable object, determining a shareable target object associated with the interface element, wherein the determining of the shareable target object comprises:
   determining a background program that is running and that is associated with the interface element, and
   obtaining the target object from the background program; and
   sharing the target object with a target device.

2. The method according to claim 1, wherein the determining a background program that is running and that is associated with the interface element comprises:
   determining a system resource controlled by the interface element;
   searching for the background program that is running and that occupies the system resource; and determining the background program as the background program associated with the interface element.

3. The method according to claim 2, wherein after the interface element triggered by the trigger gesture performed on the display interface of the terminal device is determined, the method further comprises:
if the interface element is a shareable object, sharing the interface element with the target device.

4. The method according to claim 1, wherein when the interface element is a volume slider and the background program associated with the volume slider is a media player, the obtaining the target object from the background program comprises:
obtaining a media file that is being played by the media player; and
determining the obtained media file as the target object.

5. The method according to claim 4, wherein the sharing the target object with a target device comprises:
when detecting a screen projection operation, sending the media file to the target device in response to the screen projection operation, so that the target device displays and plays the media file.

6. The method according to claim 5, wherein after the interface element triggered by the trigger gesture performed on the display interface of the terminal device is determined, the method further comprises:
if the interface element is a shareable object, sharing the interface element with the target device.

7. The method according to claim 4, wherein after the interface element triggered by the trigger gesture performed on the display interface of the terminal device is determined, the method further comprises:
if the interface element is a shareable object, sharing the interface element with the target device.

8. The method according to claim 1, wherein the determining a shareable target object associated with the interface element comprises:
obtaining a function service associated with the interface element; and
determining a permission of the function service as the target object.

9. The method according to claim 8, wherein when the interface element is a switch of a wireless network, the sharing the target object with a target device comprises:

obtaining a shared whitelist of the wireless network to which the terminal device is connected; and
adding the target device to the shared whitelist of the wireless network, so that the target device can be connected to the wireless network without password.

10. The method according to claim 8, wherein after the interface element triggered by the trigger gesture performed on the display interface of the terminal device is determined, the method further comprises:
if the interface element is a shareable object, sharing the interface element with the target device.

11. The method according to claim 1, wherein before the sharing the target object with a target device, the method further comprises:
obtaining location information of the terminal device and location information of all devices within a preset range around the terminal device;
displaying the location information of the terminal device and the location information of all the devices in the display interface of the terminal device; and
selecting the target device from all the devices according to an inputted device selection instruction.

12. The method according to claim 11, wherein after the interface element triggered by the trigger gesture performed on the display interface of the terminal device is determined, the method further comprises:
if the interface element is a shareable object, sharing the interface element with the target device.

13. The method according to claim 1, wherein after the interface element triggered by the trigger gesture performed on the display interface of the terminal device is determined, the method further comprises:
if the interface element is a shareable object, sharing the interface element with the target device.

14. A terminal device, comprising a memory, a processor, and a computer program that is stored in the memory and that can be run on the processor, wherein when the processor executes the computer program, the terminal device implements the information sharing method according to claim 1.

15. A computer-readable storage medium, storing a computer program, wherein when the computer program is executed, the information sharing method according to claim 1 is implemented.

* * * * *

UNITED STATES PATENT AND TRADEMARK OFFICE
CERTIFICATE OF CORRECTION

PATENT NO. : 11,977,932 B2
APPLICATION NO. : 17/907783
DATED : May 7, 2024
INVENTOR(S) : Shishu Yang et al.

Page 1 of 1

It is certified that error appears in the above-identified patent and that said Letters Patent is hereby corrected as shown below:

On the Title Page

Change Item "(71) Applicant: HONOR DEVICE CO., LTD., Guangdong (CN)" to --(71) Applicant: HONOR DEVICE CO., LTD., Shenzhen (CN)--;

In the Specification

Column 5, Line 30, change "character 'I'" to --character "/"--; and

Column 14, Line 19, change "(Ultra WideB and)" to --(Ultra WideBand)--.

Signed and Sealed this
Eleventh Day of June, 2024

Katherine Kelly Vidal
*Director of the United States Patent and Trademark Office*